United States Patent [19]

Izawa et al.

[11] Patent Number: 5,771,046

[45] Date of Patent: Jun. 23, 1998

[54] IMAGE PROCESSING SYSTEM AND METHOD INCLUDING PERSPECTIVE TRANSFORMATION OF THREE-DIMENSIONAL OBJECTS UTILIZING CLIPPING PLANE POSITIONS

[75] Inventors: Yasuhiro Izawa, Sanda; Hitoshi Yamamoto, Amagasaki; Hitoshi Kadoya, Minoo, all of Japan

[73] Assignee: Ricoh Company, Ltd., Tokyo, Japan

[21] Appl. No.: 607,277

[22] Filed: Feb. 21, 1996

Related U.S. Application Data

[63] Continuation-in-part of Ser. No. 492,440, Jun. 19, 1995, abandoned.

[30] Foreign Application Priority Data

| | | | |
|---|---|---|---|
| Jun. 20, 1994 | [JP] | Japan | 6-137688 |
| Oct. 20, 1994 | [JP] | Japan | 6-255086 |
| Jun. 20, 1995 | [JP] | Japan | 7-176806 |

[51] Int. Cl.$^6$ .................................................. G06T 15/10
[52] U.S. Cl. ........................................ 345/427; 345/430
[58] Field of Search .................................... 345/418, 426, 345/433, 434, 430

[56] References Cited

U.S. PATENT DOCUMENTS

| | | | |
|---|---|---|---|
| 5,361,386 | 11/1994 | Watkins et al. | 395/130 |
| 5,559,937 | 9/1996 | Takeda | 395/134 |

FOREIGN PATENT DOCUMENTS

| | | |
|---|---|---|
| 63-80375 | 4/1988 | Japan . |
| 5-298456 | 11/1993 | Japan . |

OTHER PUBLICATIONS

Hearn, Donald, et al, "Computer Graphics", *Prentice Hall*, 1994, 443 –446, 472 –475, 494 –513 and 552 –557.

Blinn, Jim, "A Trip Down the Graphics Pipeline: The Homogeneous Perspective Transformation", *IEEE Computer Graphics and Applications Magazine*, v13, No. 3, pp. 75–80, May 1993.

Webster, Graeme, "3D Computer Graphics –The Basic Transformations",v5,n11,p. 24(5), May, 1991.

Prosise, Jeff, "Understanding modelview transformations in OpenGL for Windows NT" *Microsoft Systems Journal*, v10, n2, p. 19(18), Feb, 1995.

Abrash, Michael, "3–D Animation", Dr. Dobb's Journal, v17,n1, p. 121(7), Jan, 1992.

(List continued on next page.)

*Primary Examiner*—Joseph H. Feild
*Assistant Examiner*—Rudolph Buchel
*Attorney, Agent, or Firm*—Cooper & Dunham LLP

[57] ABSTRACT

Perspective transformation is performed on X, Y, Z coordinate data Xe, Ye and Ze in a view volume in a viewpoint coordinate system so as to obtain X, Y, Z coordinate data Xs, Ys and Zs in a screen coordinate system. The view volume being defined by a front clipping plane and a rear clipping plane, in which: Zs=1-CZF/Ze, or Zs=CZF/Ze, or Zs=1/Ze when a difference between a Z value CZF at the front clipping plane and a Z value CZB at the rear clipping plane is substantially large. Data bits of the Zs are shifted depending on the Z value CZF, when the difference between the Z value CZF at the front clipping plane and the Z value CZB at the rear clipping plane is substantially large where the view volume is defined by the front clipping plane and the rear clipping plane, or when the view volume is defined only by the front clipping plane. Then, a hidden-surface removal operation is performed using a Z-buffer method in accordance with the Zs.

22 Claims, 24 Drawing Sheets

OTHER PUBLICATIONS

Strearns, Chip, et al, "The Coreware Methodology: Building a 200 Mflop Processor In 9 Man Months" *ASIC Conference and Exhibit*, 1992, pp. 549–552.

Jau, J.C., et al, "Shape from Texture Using Wigner Distribution", *Computer Vision and Pattern Recognition*, 1988, pp. 515–523.

Ohno, Yoshio Ohno, Introduction to Real Video Production through CG, The journal PIEXL (No. 73), published by Figure Information Processing Center, Oct. 1, 1988, pp. 88–89.

Ohta, Masataka et al., Applied Graphics, published by ASCII Co. Ltd., Japan, Nov. 1, 1987, chapter 3, Modeling—Various Methods for Expressing Objects, page 64.

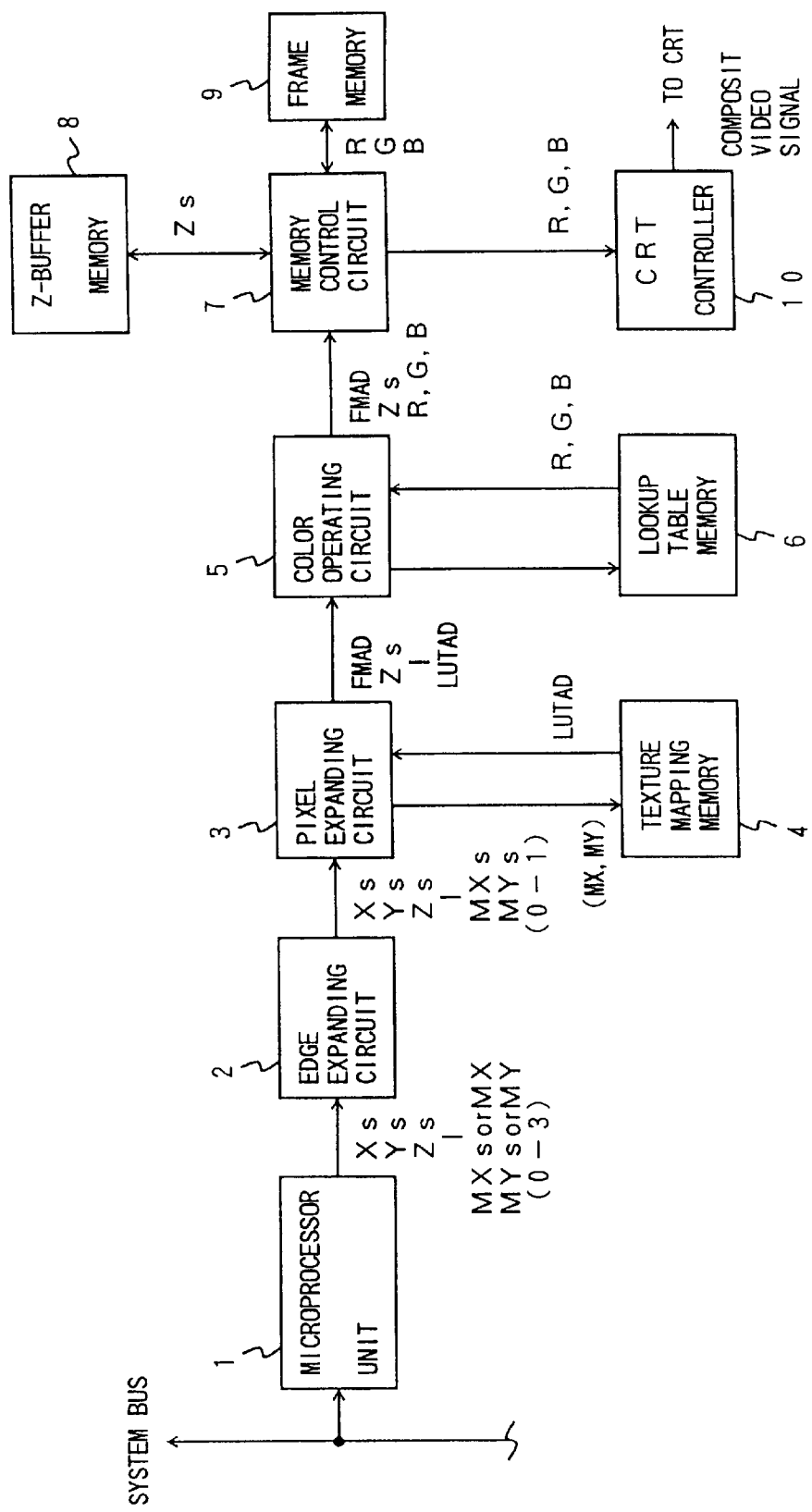

F I G. 1 2
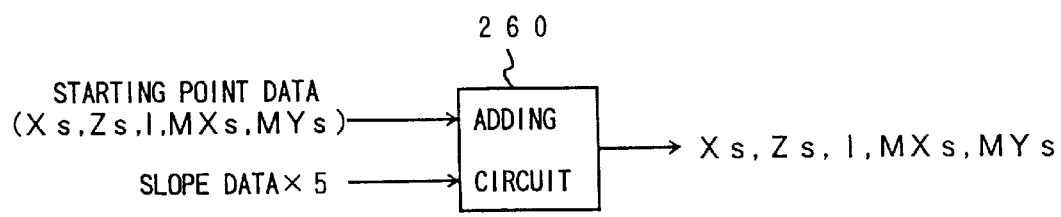
F I G. 1 3
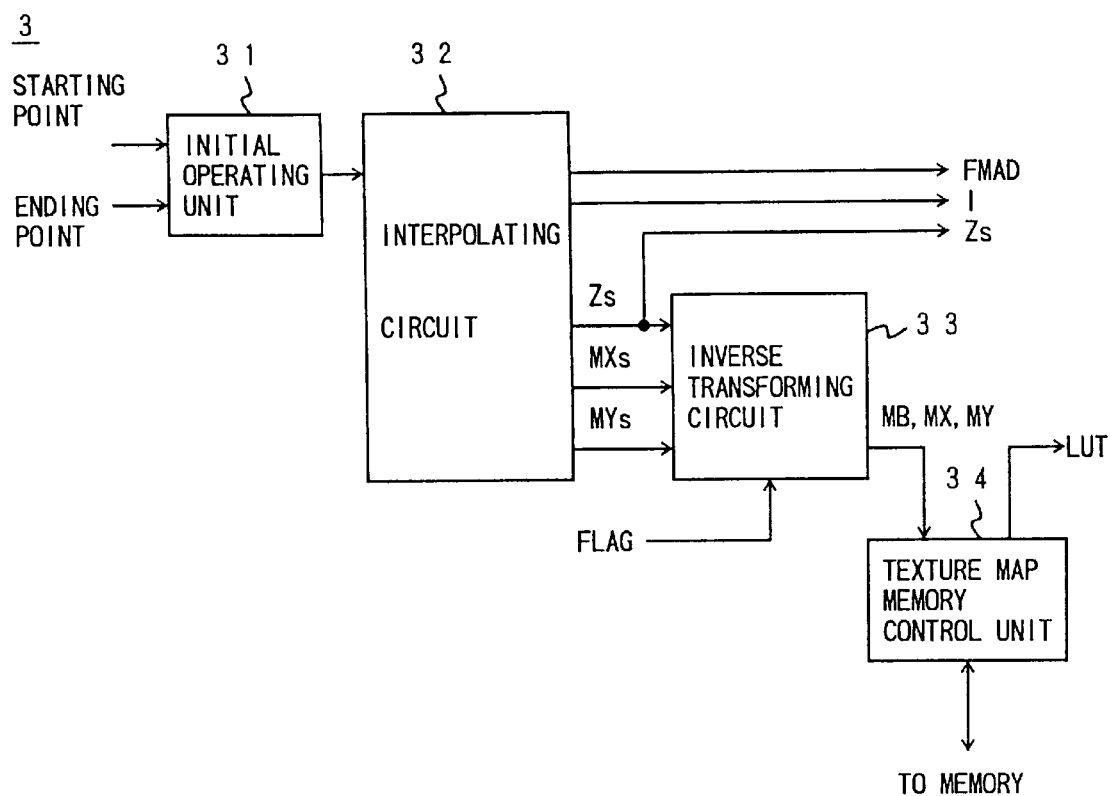

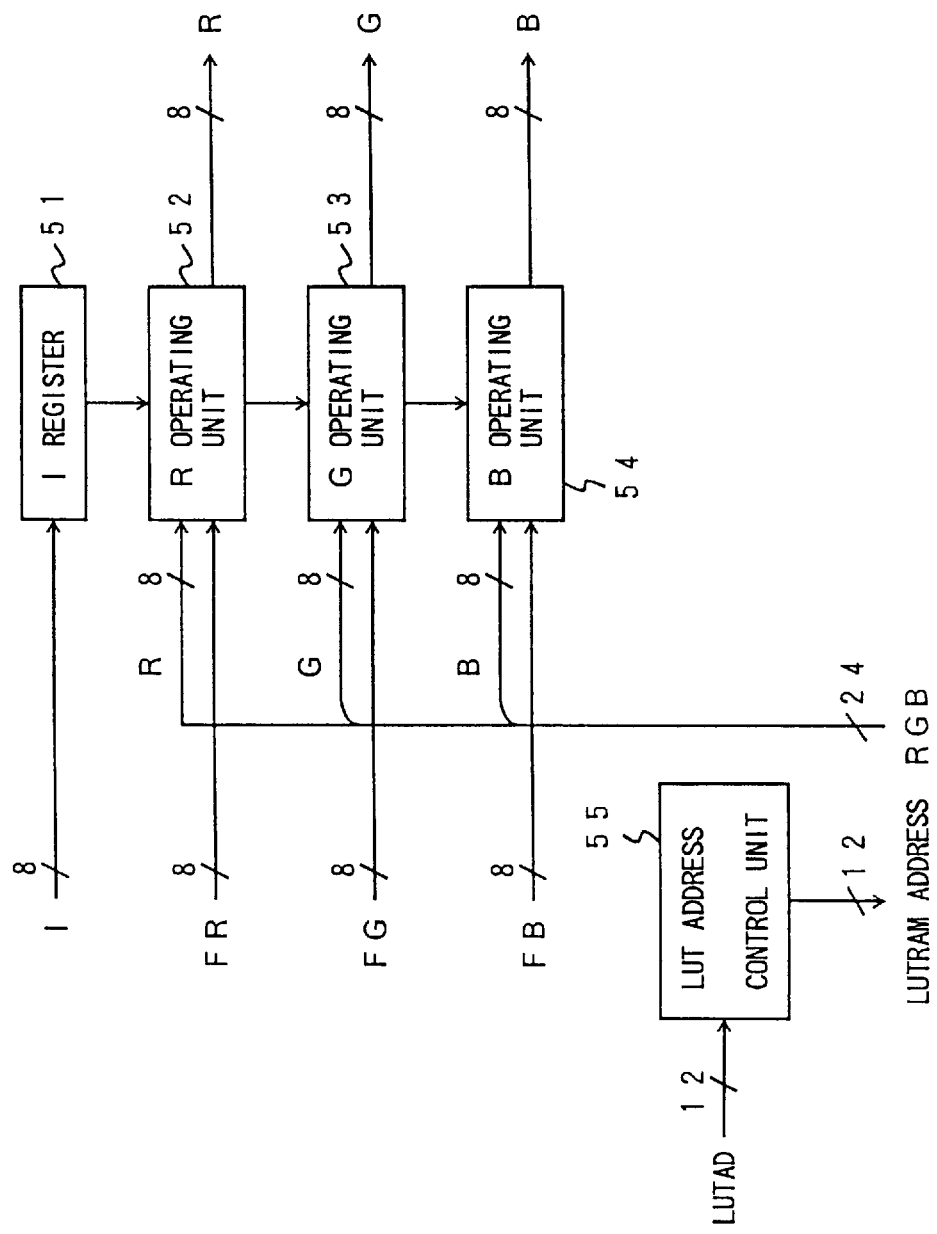

FIG. 28A

FIG. 28B (NUMBER OF VALID BITS: 10)

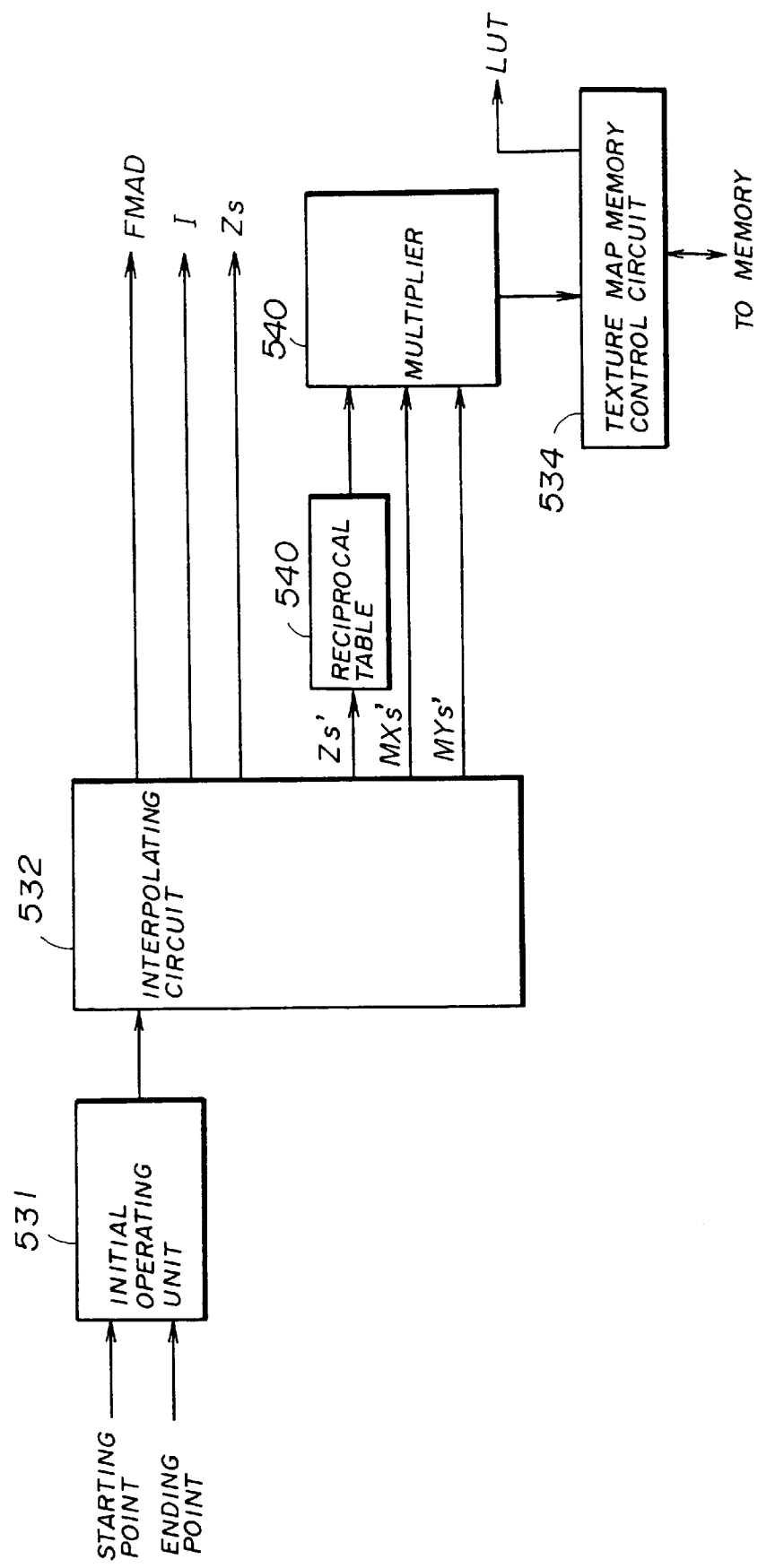

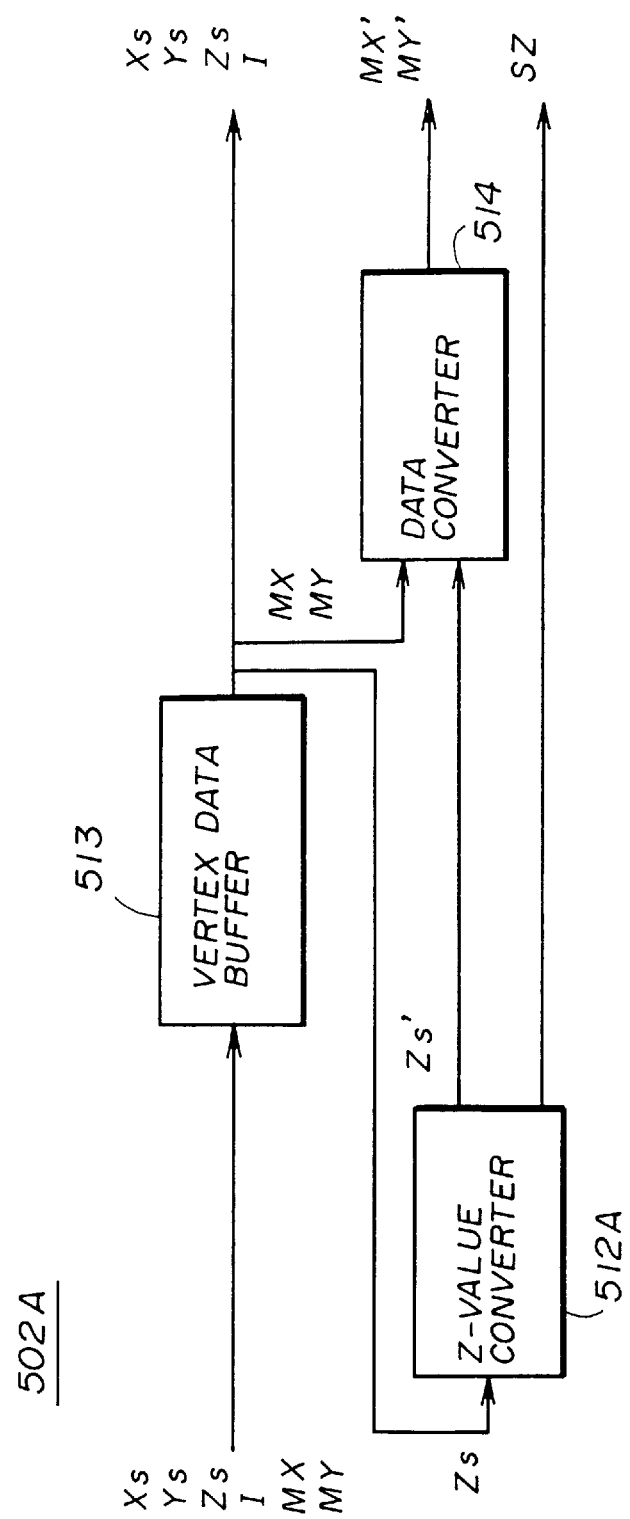

IMAGE PROCESSING SYSTEM AND METHOD INCLUDING PERSPECTIVE TRANSFORMATION OF THREE-DIMENSIONAL OBJECTS UTILIZING CLIPPING PLANE POSITIONS

CROSS-REFERENCE TO RELATED APPLICATION

This application is a continuation-in-part of commonly owned parent application Ser. No. 08/492,440 now abandoned filed Jun. 19, 1995, which is incorporated in its entirety herein by reference.

BACKGROUND OF THE INVENTION

1. Field of the Invention

The present invention relates to a three-dimensional image processing system and method, and in detail, relates to a three-dimensional image processing system and method through which texture mapping is performed on polygons in a screen coordinate system that is obtained from performing a perspective transformation and using a Z-buffer method in hidden-surface removal.

2. Description of the Related Art

In computer graphics, a viewing pyramid is determined and then a perspective transformation process and clipping process is performed. A world coordinate system is used and then the viewing pyramid is formed based on a viewpoint, a line of sight direction, and a view angle in the world coordinate system.

In coordinate transformation from the world coordinate system to a viewpoint coordinate system, the viewing pyramid is subjected to parallel displacement so that the viewpoint is coincident with the origin of the coordinate system. Then, the viewing pyramid is rotated so that the line of sight is coincident with the positive direction of the Z axis of the coordinate system. Affine-transformation is used for this coordinate transformation. The perspective transformation is used for transforming the viewpoint coordinate system to the screen coordinate system.

In three-dimensional graphics, a Z-buffer algorithm is currently most generally used as an algorithm of a hidden-surface removal method. This is because the Z-buffer algorithm is simple and enables high-speed rendering of an image using a very large amount of shape data in comparison to various other algorithms of the hidden-surface removal methods.

Before performing a hidden-surface removal using the Z-buffer algorithm, it is necessary to perform the above-mentioned coordinate transformation which includes the above-mentioned perspective transformation. Thereby, the viewpoint coordinate system is transformed into the screen coordinate system, that is, three-dimensional image data is converted into two-dimensional image data. If the Z-buffer method is applied to the two-dimensional image data in the screen coordinate system, it is necessary to perform the perspective transformation not only on X values and Y values but also on Z values of the three-dimensional image data. If the perspective transformation is not performed also on the Z values, some problems may occur during the perspective transformation. The problems include phenomena that a straight line is not projected to be a straight line, a plane is not projected to be a plane, and a spatial relationship between the front and the rear is inverted.

Various methods for performing the perspective transformation on the Z values have also been proposed. However, a method has not been proposed which is suitable for a video game in which it is necessary to display many objects or bodies, each formed of a mass of polygons.

As in the texture mapping method, there is a method in which inverse perspective transformation is performed for each pixel. However, this method has a problem in that processing speed is not high and it is not possible to performing texture mapping in real time.

In order to solve the above-mentioned problems, texture mapping apparatuses are proposed in Japanese Laid-Open Patent Applications Nos.63-80375 and 5-298456. These apparatuses are provided with I/O interfaces, memories, edge interpolating circuits, segment interpolating circuits, mapping memories, multiplying circuits and so forth. The apparatus disclosed therein performs texture mapping using digital differential analysis.

In the texture mapping apparatus disclosed in Japanese Laid-Open Patent Application No.63-80375, apex data corresponding to start and end points of two sides subjected to side interpolation are supplied to side interpolating circuits on the basis of a plurality of transmitted apex data. Division number data of side interpolating is calculated on the basis of the length of the side determined by a pair of apex data and is supplied to the circuits. In each side interpolating circuit, the length of the side is divided by division number data and the divided value is successively accumulatively added to one apex data to obtain side interpolating data. This data is sent to segment interpolating circuits. Graphic data in a mapping memory is projected, through a frame memory, onto picture element coordinates obtained by circuits to display data, which corresponds to the graphic pattern subjected to texture mapping.

In the texture mapping apparatus disclosed in Japanese Laid-Open Patent Applications No.5-298456, microprocessor dividing means divides an edge of a polygon to be plotted in a display screen into a right edge and a left edge. A scan converting part generates dot data on the same scan line of the edges. A pixel interpolating circuit executes interpolation between both dots of dot data from the scan conversion. The above dot data is continuously written by a pixel on the one scan line in a texture memory so that the texture mapping is executed and processed at high speed.

However, in these apparatuses, depth is not considered. Therefore, a straight line on a texture map is seen as being distorted and smooth movement of an image cannot be achieved.

Further, in these apparatuses, a data processing rate is not sufficiently high and also an electrical circuit scale is relatively large.

SUMMARY OF THE INVENTION

An object of the present invention is to provide a three-dimensional image processing system and method, using the Z-buffer method, in which the Z values are considered and to perform texture mapping considering the depth information and to perform Gouraud shading. Further, according to the system and method, a data processing rate can be improved and an electrical circuit scale can be miniaturized.

In a three-dimensional image processing method and system according to the present invention; perspective transformation is performed on X, Y, Z coordinate data Xe, Ye and Ze in a view volume in a viewpoint coordinate system so as to obtain X, Y, Z coordinate data Xs, Ys and Zs in a screen coordinate system. The view volume is defined by a front clipping plane and a rear clipping plane, in which: Zs=1-CZF/Ze, when a difference between a Z value CZF at the front clipping plane and a Z value CZB at the rear clipping plane is substantially large; or $Zs=CZF/Ze$, or $Zs=1/Ze$, and data bits of the Zs are shifted depending on a Z value CZF, when the difference between the Z value CZF at the front clipping plane and the Z value CZB at the rear clipping plane is substantially large where the view volume is defined by the front clipping plane and the rear clipping plane, or when the view volume is defined only by the front clipping plane.

Then, a hidden-surface removal operation is performed using a Z-buffer method in accordance with the Zs. Thereby, relatively high accuracy calculation results can be obtained in a relatively simple calculation process. Further, it is preferable that the X, Y coordinate data of the texture map and Zs are multiplied together and to produce multiplied coordinate data of the texture map. Thus, the perspective transformation is performed on the X, Y coordinate data of the texture map.

Then, the means for interpolating left edges and right edges interpolates image data between vertices of the polygon of the image data including the multiplied coordinate data of the texture map. The means for interpolating pixels interpolates image data between the left edges and right edges of image data, the system further comprises means for dividing X, Y coordinate data of the texture map included in the pixels of image data by Zs included in the pixels of image data, and producing divided coordinate data of the texture map. Thus, inverse perspective transformation is performed on the X, Y coordinate data of the texture map included in the pixels of image data.

The means for reading texture data reads the texture data from the texture mapping memory in accordance with the divided coordinate data of the texture map. Thereby, it is possible to perform a texture mapping operation considering the depth of the view volume.

Another image processing system according to the present invention for performing texture mapping of a three-dimensional image in use of a Z-buffer method in hidden-surface removal comprises:

converting means for determining a maximum value of perspective-transformation performed depth values Zs for vertices of a currently processing polygon, the maximum value being used as a reference and thus perspective-transformation performed depth values for all the other vertices of the polygon being converted into values Zs' of the predetermined number of valid bits;

pixel expanding means for performing pixel expanding on the converted values Zs' and texture map data which has undergone the perspective transformation in use of the converted value Zs'; and dividing means for dividing the pixel-expansion performed texture map data by the pixel-expansion performed, converted values Zs'.

According to this arrangement, it is possible to reduce a number of bits representing a depth value and thereby reduce a number of bits representing texture map data. As a result, it is possible to reduce a number of bits (as a capability) of each of internal operation units which handle the bit-number reduced value/data. Thereby, it is possible to advantageously reduce a total electrical circuit scale of the image processing system, and costs required for the system accordingly.

The dividing means may comprise a reciprocal table for obtaining reciprocals of the pixel-expansion performed, converted values Zs' and multiplying means for multiplying the pixel-expansion performed texture map data by the reciprocals of the pixel-expansion performed, converted values Zs'. As a result, it is possible to further reduce the total electrical circuit scale of the image processing system, and the costs required for the system.

The image processing system may further comprises altering means for altering the predetermined number of valid bits of the converting means. Thereby, it is possible to adjust a data processing accuracy of the texture mapping operation of the three-dimensional image adaptably to for particular purposes.

Other objects and further features of the present invention will become more apparent from the following detailed description when read in conjunction with the accompanying drawings.

BRIEF DESCRIPTION OF THE DRAWINGS

FIG. 6 shows a block diagram of an image processing system in a second embodiment of the present invention;

FIG. 12 shows a block diagram of an example of the interpolating circuit using the adding circuit shown in FIG. 11;

FIG. 13 shows a block diagram of an example of a pixel expanding circuit used in the system shown in FIG. 6;

FIG. 19 shows a block diagram of the color operating unit used in the system shown in FIG. 6;

FIGS. 28A and 28B illustrate depth information conversion in the fourth embodiment of the present invention;

FIG. 29 shows a block diagram of a pixel expanding circuit of a fifth embodiment of the present invention;

FIG. 30 shows a block diagram of a texture data converter in a sixth embodiment of the present invention.

DESCRIPTION OF PREFERRED EMBODIMENTS

Figure 1:
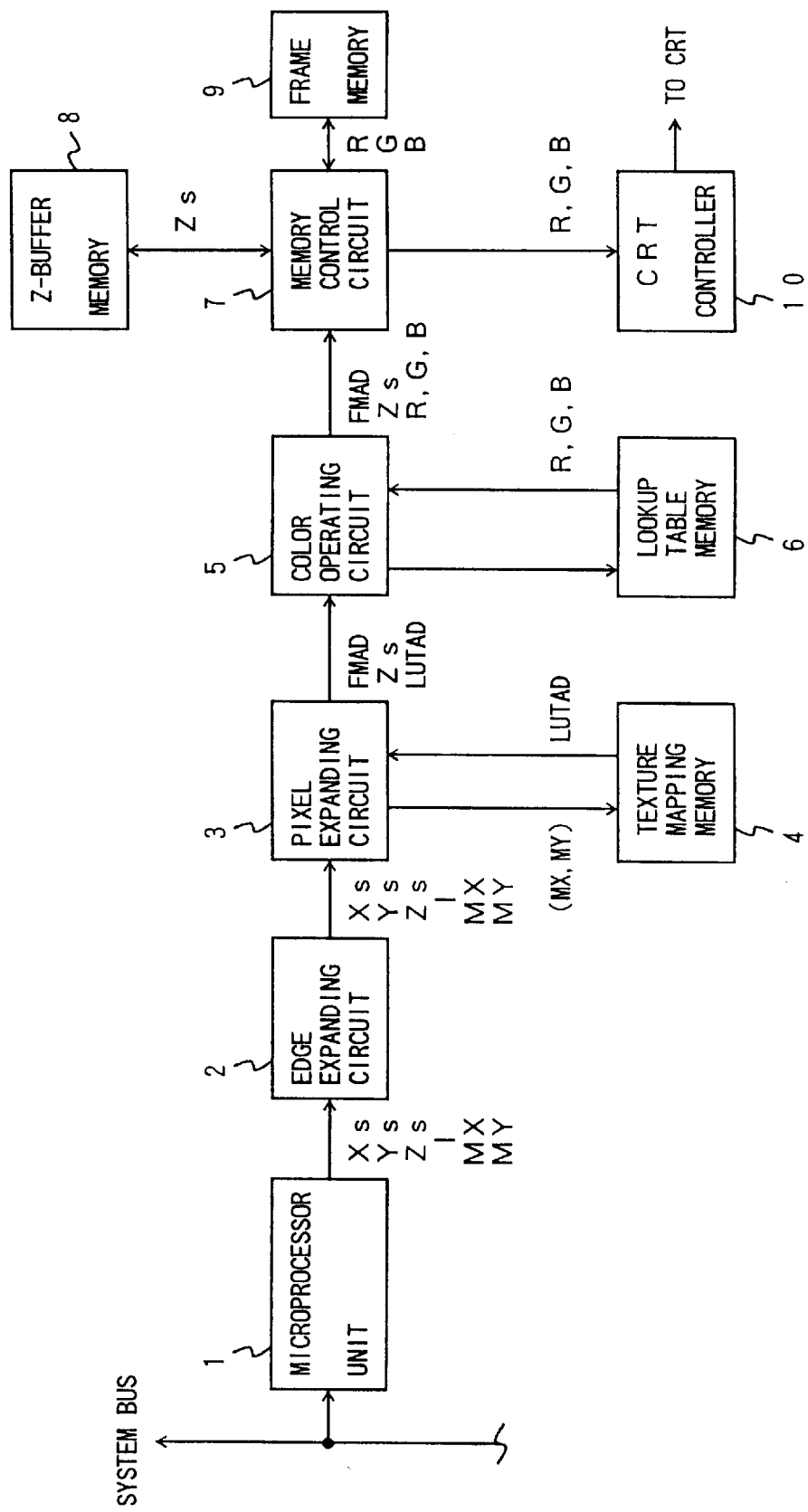
FIG. 1 shows a block diagram of an image processing system in a first embodiment of the present invention.

With reference to FIG. 1, a general structure of an image processing system in a first embodiment of the present invention will now be described.

A microprocessor unit 1 performs coordinate transformation on image data from the viewpoint coordinate system to the screen coordinate system in the perspective transformation. Prior to this transformation, coordinate transformation between the world coordinate system to the viewpoint coordinate system in the affine-transformation is performed on the image data either by another system not shown in FIG. 1 or by the microprocessor unit 1.

The hidden-surface removal using the Z-buffer algorithm is then performed on the image data in the screen coordinate system as will be described later. As mentioned above, the perspective transformation should be performed also on the Z values of the image data because the hidden-surface removal using the Z-buffer algorithm will be performed on the resulting image data as mentioned above.

There is a method for performing the perspective transformation on the Z values, which uses the following equation (1):

$$Zs = 1/Ze \quad (1),$$

wherein Zs represents a Z value in the screen coordinate system and Ze represents a Z value in the viewpoint coordinate system. This method is according to a Japanese book *APPLIED GRAPHICS*, published by ASCII Co. Ltd., on Nov. 1, 1987, written by Masataka Ohta, Akira Takeuchi, and Takayuki Ohguchi, chapter 3, *MODELING* -Various Methods for Expressing Objects-, page 64.

As Ze varies farther from the view point, from CZF to CZB, Zs in equation (1) varies from 1/CZF to nearly 0. Therefore, when the Z-buffer method is used using Zs, the Z value in the Z-buffer is initialized to '0'. Then, when the Zs value of each pixel is compared with the Z value in the Z-buffer, the Z value in the Z-buffer is replaced by the Zs value of the pixel only if the Zs value of the pixel is larger than the Z value in the Z-buffer, in the Z-buffer hidden-surface removal process.

Accuracy of the method using this equation (1) is not high when Ze varies in a relevant range between CZF and CZB, because in the equation (1), Zs varies in a relatively large range as Ze varies between 0 and CZF while Zs varies in a relatively small range as Ze varies in the relevant range between CZF and CZB.

In order to improve the accuracy of the method for performing the perspective transformation on the Z values, the following method has been proposed, for example, in the journal *PIXEL* (No.73), published by the Figure Information Processing Center, on Oct. 1, 1988, pages 88–89, 'Introduction to Real Video Production through CG', written by Yoshio Ohno. In this method, a depth-direction range of a view volume is made as short as possible and normalized into a range between 0 and 1.

According to the PIXEL journal, the perspective transformation is represented by the following matrix equation:

$$\begin{bmatrix} X \\ Y \\ Z \\ W \end{bmatrix} = \begin{bmatrix} 1 & 0 & 0 & 0 \\ 0 & 1 & 0 & 0 \\ 0 & 0 & A & B \\ 0 & 0 & C & 0 \end{bmatrix} \begin{bmatrix} Xe \\ Ye \\ Ze \\ We \end{bmatrix},$$

Xs=X/w, Ys=Y/w, and Zs=Z/w;

where A=0, B=1, and C=1/d, wherein "d" represents a distance between the viewpoint and the screen. Thus, a point (Xe, Ye, Ze) in the viewpoint coordinate system is transformed to a point (Xs, Ys, Zs) in the screen coordinate system. Thus, the perspective transformation is performed on the Z value as well as the X value and Y value.

The depth-direction range of the view volume is made as short as possible and the Z value is normalized into the range between 0 and 1, as a result of determining the above-mentioned constants "A", "B" and "C" as follows:

$A=CZB/\{d(CZB-CZF)\}$, $B=-CZB \cdot CZF/\{d(CZB-CZF)\}$, and $C=1/d$, wherein CZF represents a Z value of a front clipping plane of the view volume, and CZB represents a Z value of a back clipping plane of the view volume.

From the above-mentioned matrix equation, $Z=Ze \cdot A+B$, and $W=C \cdot Z$.

From the above equations, the following equation (2) is obtained:

$$\begin{aligned} Zs &= Z/W = (A \cdot Ze + B)/C \cdot Ze \\ &= a(1 - CZF/Ze) \end{aligned} \quad (2)$$

where $a = CZB/(CZB - CZF)$.

In a case where three-dimensional graphics are used in a video game, many objects may be displayed as mentioned above. In such a case, it is likely that a long distance exists between CZF and CZB. If this distance is very long, that is, if CZB>>CZF, the above-mentioned "a" is approximately 1. the first embodiment of the present invention uses this characteristic. When a≈1, the above-mentioned equation (2) is simplified as the following equation (3):

$$Zs = 1 - CZF/Ze \quad (3).$$

This equation (3) is simpler than equation (2) and thus operation of equation (3) can be easily performed.

Therefore, in the embodiment, the microprocessor unit 1 performs the perspective transformation on the Z values based on equation (3) in a case where many objects are displayed through the three-dimensional graphics.

X values and Y values (Xs, Ys) in the screen coordinate system are calculated from X values and Y values (Xe, Ye) in the viewpoint coordinate system through the following equation (4):

$$Xs = Xe \cdot d / Ze; \quad Ys = Ye \cdot d / Ze \qquad (4),$$

wherein "d" represents the distance between the viewpoint and the screen.

As Ze varies farther from the viewpoint, from CZF to CZB, Zs in equation (3) varies from 0 to $(1-CZF/CZB) \approx 1$. Therefore, when the Z-buffer method is used using Zs, the Z value in the Z-buffer is initialized to '1'. Then, when the Zs value of each pixel is compared with the Z value in the Z-buffer, the Z value in the Z-buffer is replaced by the Zs value of the pixel only if the Zs value of the pixel is smaller than the Z value in the Z-buffer, in the Z-buffer hidden-surface removal process.

Instead of using of Zs which varies Zs from nearly 0 to nearly 1 as Ze varies from CZF to CZB, it is also possible to use Zs which varies from 1 to nearly 0 as the Ze varies from CZF to CZB. In this case, instead of using the equation (3), the following equation (5) is used:

$$Zs = CZF/Ze \qquad (5).$$

In this case, when the Z-buffer method is used using Zs, the Z value in the Z-buffer is initialized to '0'. Then, when the Zs value of each pixel is compared with the Z value in the Z-buffer, the Z value in the Z-buffer is replaced by the Zs value of the pixel only if the Z values of the pixel is larger than the Z value in the Z-buffer, in the Z-buffer hidden-surface removal process.

By using either one of the above-mentioned equations (3) and (5) instead of the equation (1), accuracy is high when Ze varies in a relevant range between CZF and CZB. This is because in either one of the equation (3) and (5), Zs varies in a relatively large range as Ze varies in the relevant range between CZF and CZB.

Further, it is possible to improve the accuracy of the perspective transformation of the Z values by appropriately shifting data bits representing a result of equation (1). Specifically, the data bits of Zs obtained from equation (1) are shifted depending on CZF. For example, if CZF=Ze=33, 1/Ze=1/33 is expressed by "07c1h" in 16-bit decimal. Because $CZF \leq Ze$, if CZF=33, each bit of the most significant 5 bits in the 16 bits is fixed to be 0 when Ze varies in the condition that $CZF \leq Ze$. Therefore, it is possible to shift 5 bits of the decimal bits. It is noted that if the decimal bits are shifted 5 bits, it is necessary to previously obtain the value 1/Ze in decimal bits, the number of the bits being more than 21. This can be achieved by a divider for obtaining the 1/Ze provided in the microprocessor unit 1 which outputs a result in 32 bits. As a result of shifting the data bits of 1/Ze, it is necessary to improve the accuracy of the value 1/Ze and thus it is possible to improve the accuracy of the perspective transformation of the Z values using equation (1).

Thus, the microprocessor unit 1 shown in FIG. 1 supplies image data including the Z values on which the perspective transformation is performed by the unit 1. The thus-supplied image data is then supplied to an edge expanding circuit 2 shown in FIG. 1. In the perspective transformation performed on the Z values, if a distance between CZF and CZB is so long that $CZB/(CZB-CZF) \approx 1$, equation (5) is used.

However, if the distance between CZF and CZB not so long, equation (3) is used. Thus, the microprocessor unit 1 changes the manner in which the values Zs are calculated depending on the distance between CZB and CZF.

Figure 2:
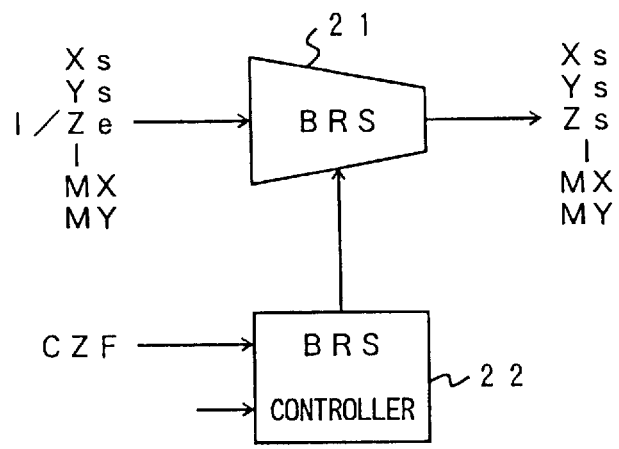
FIG. 2 shows a block diagram of a shifter circuit provided at an input part of an edge expanding circuit of the system shown in FIG. 1.

If it is preferable to further reduce the amount of calculation performed by the microprocessor unit 1, the above-mentioned equation (1) may be used instead. If the equation (1) is used, the data bits of 1/Ze are shifted as mentioned above. This shift operation may be performed by the microprocessor unit 1. However, in this embodiment, this shift operation is performed in the edge expanding circuit 2 using a barrel shifter or a multiplexer. The barrel shifter is a shifter in which a number of bits to be shifted may be freely specified. FIG. 2 shows one example of a shifter circuit using the barrel shifter 21. Such a shifter circuit is provided in a data inputting unit in the edge expanding circuit 2. Data bits obtained as a result of performing the perspective transformation on X, Y, 1/Ze, I (luminance values), MX and MY are input to a barrel shifter 21. The barrel shifter 21 outputs the shifted Z values and X, Y, I, MX and MY. The MX and MY represent X, Y coordinate data as a texture mapping address. Then, the output data is used for performing edge expanding. If several parameters (such as X, Y, and so forth) are included in one word of the input data, these parameters can be easily identified using determination performed by a barrel shifter controller 22 shown in FIG. 2.

The microprocessor unit 1 transfers image data for each polygon in a direct memory access transfer (hereinafter referred to as DMA) method to the edge expanding circuit 2. The microprocessor unit 1 includes circuits necessary for performing the DMA transfer method.

However, if image data is transferred polygon by polygon as mentioned above, either a lot of time is required or it is necessary to provide special control circuits for reducing the amount of time required. This is because a time required for processing a polygon of image data through units starting from the edge expanding circuit may be longer or shorter than a time required for transferring the polygon of image data through the DMA method. This is because sizes of polygons are not uniform. As a result, a waiting time may be required for which a unit in the image data processing system may wait for another unit therein to complete its task.

Figure 3:
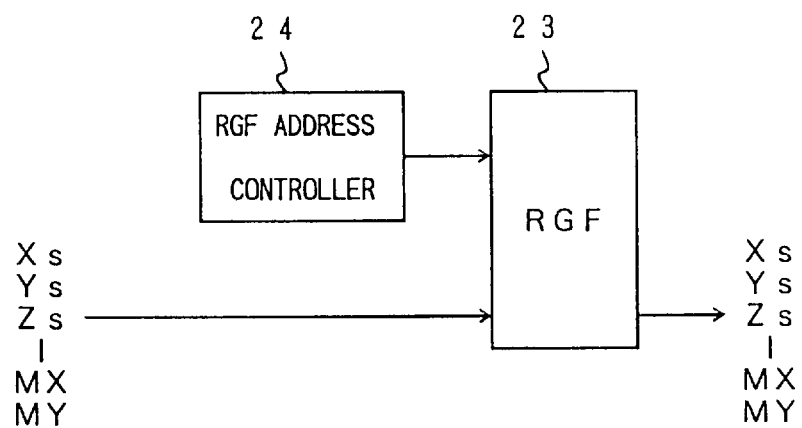
FIG. 3 shows a block diagram of a register file device used in the edge expanding circuit.

In the first embodiment of the present invention, a register file device (hereinafter referred to as RGF) 23 shown in FIG. 3 is provided in the edge expanding circuit 2. The RGF is a memory which includes many registers integrated therein. The RGF 23 is controlled by an RGF address controller 24 and stores therein the image data Zs, Xs, Ys, I, MX, and MY transferred from the microprocessor unit 1. By providing the RGF 23, the amount of time required in performing the DMA transfer method can be reduced.

Figure 4:
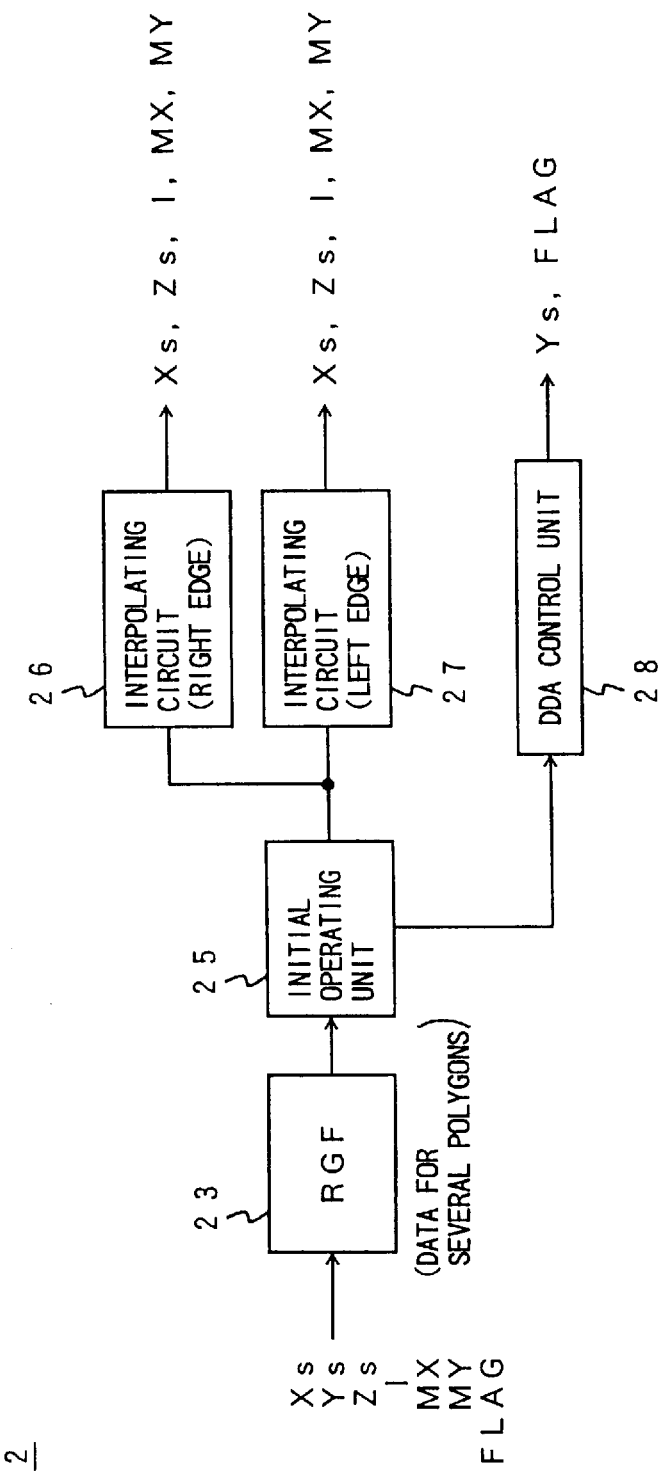
FIG. 4 shows a block diagram of an example of the edge expanding circuit.

With reference to FIG. 4, the edge expanding circuit 2 will now be described. As mentioned above, the microprocessor unit 1 transfers the screen coordinate values Xs, Ys, Zs, MX and MY, and the luminance values I to the RGF 23 by use of the DMA transfer method. Simultaneously, flags given to the polygons such as flat shading flags or Gouraud shading flags are also transferred to the RGF 23. The data is then sent to a initial operating unit 25 from the RGF 23. In this embodiment, the initial operating unit 25 includes the above-described shifting circuit shown in FIG. 2.

Figure 5:
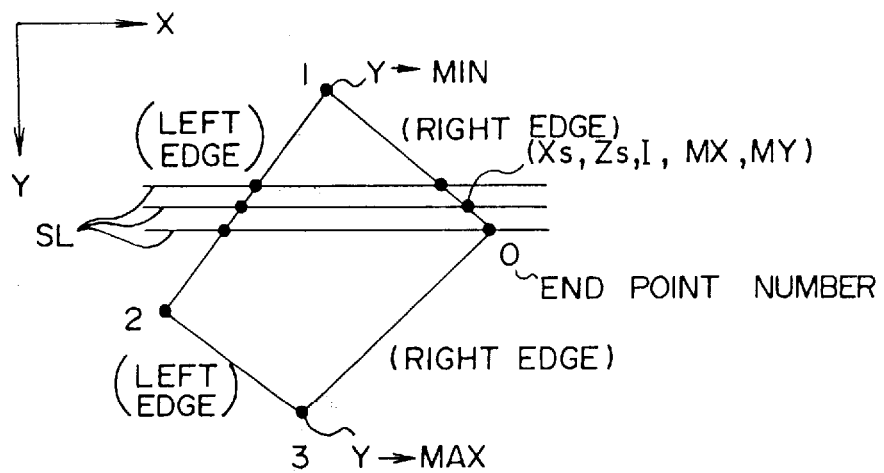
FIG. 5 illustrates a polygon processed by the edge expanding circuit.

Polygon image data is divided into image data for right edges and image data for left edges of each polygon shown in FIG. 5. A shape of the polygon is not limited to a four-sided figure shown in FIG. 5 and may be any polygon. The image data for right edges is input to an interpolating circuit 26 which interpolates points present along each edge between two end points through digital differential analyzing (hereinafter referred to as DDA). The interpolating circuit 26 transfers the thus-interpolated point data Xs, Zs, I, MX, MY to a pixel expanding circuit 3. Similarly, the image data for left edges is input to an interpolating circuit 27 which interpolates points present along each edge between two end points through DDA. The interpolating circuit 27 transfers the thus-interpolated point data Xs, Zs, I, MX, MY to the pixel expanding circuit 3. Further, a DDA control unit 28 outputs scan line data, that is, Y data and flags.

The pixel expanding circuit 3 uses image data of each pair of points (of a respective right edge and a respective left edge) of the point data transferred from the two interpolating circuits 26 and 27. The pixel expanding circuit 3 interpolates a straight line between each pair of points in parallel to scan lines SL shown in FIG. 5. Accordingly, image data for pixels present on the thus-interpolated straight line is obtained. Then, using texture map addresses (MX, MY) of the thus-obtained image data for pixels as being addresses, the pixel expanding circuit 3 accesses a texture mapping memory 4. The pixel expanding circuit 3 thus obtains, from the texture mapping memory 4, texture data having address values indicated by data output from the pixel expanding circuit 3, and outputs it to a color operating circuit 5. The texture data is lookup table address data.

The color operating circuit 5 accesses the lookup table memory 6 using the lookup table address data and thus obtains color information of each pixel from the lookup table memory 6. Then, the color operating circuit 5 performs predetermined color operations using the color information so as to obtain R, G, and B values for each pixel.

A memory control circuit 7 controls data stored in a Z-buffer memory 8 and a frame memory 9. The frame memory 9 stores the R, G and B values of each pixel and the Z-buffer memory 8 has a format the same as that of the frame memory 9. The Z-buffer memory 8 stores the Zs values which indicates Z values of each pixel.

When the color data R, G and B is supplied by the color operating circuit 5 for each pixel, the memory control circuit 7 reads a Zs value for the corresponding pixel from the Z-buffer memory 8. Then, the memory control circuit 7 compares the Zs value supplied by the color operating circuit with the Zs value read from the Z-buffer memory 8 for the pixel.

For example, it is assumed that Zs is determined using the equation (3). Then, if the Zs value supplied by the color operating circuit is smaller than the Zs value read from the Z-buffer memory 8 for the pixel, it is determined that the pixel having the color values currently supplied by the color operating circuit is located nearer to the viewpoint than the pixel having the color values previously stored in the frame memory. Therefore, the color values currently supplied by the color operating circuit 5 are overwritten to the frame memory at the address indicated by relevant FMAD (frame memory address data). Further, the Zs value currently supplied by the pixel expanding circuit 3 is overwritten in the Z-buffer memory 8 at the relevant address.

If the Zs value supplied by the color operating circuit is larger than the Zs value read from the Z-buffer memory 8 for the pixel, it is determined that the pixel having the color values currently supplied by the color operating circuit is located farther from the viewpoint than the pixel having the color values previously stored in the frame memory. Therefore, the color values currently supplied by the color operating circuit 5 are ignored. Further, the Zs value which is currently supplied by the pixel expanding circuit 3 is also ignored. Thus, the hidden-surface removal is performed.

Further, in accordance with a control signal supplied by a CRT controller 10, the memory control circuit 7 reads R, G, and B color values of a just preceding frame from the frame memory 9 and outputs them to the CRT controller 10. The CRT controller 10 sends them to a CRT via a D/A converter and an RGB encoder (not shown in the figure) in the form of a composite video signal.

Thus, the image processing system shown in FIG. 1 performs the texture mapping operation using the Z-buffer method.

Figure 21:
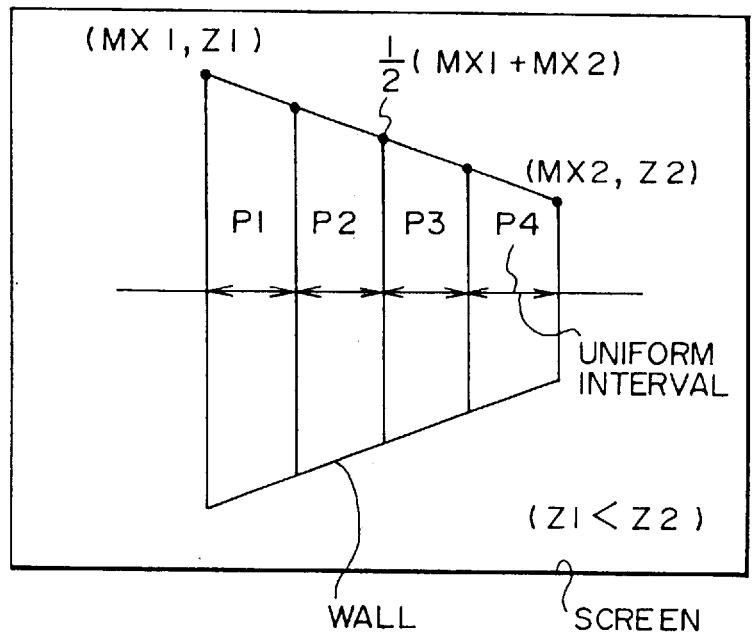
FIGS. 21 and 22 illustrate the problem which occurs when depth of a view volume is not considered for texture map addresses.
Figure 22:
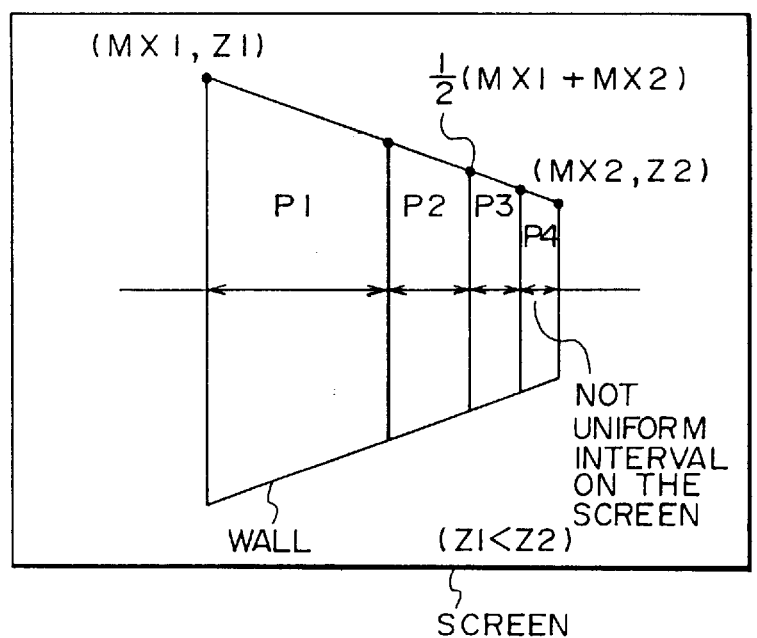

However, in the above-described image processing system in the first embodiment of the present invention, the depth is not considered for the texture mapping address MX and MY. In FIGS. 21 and 22, results of texture mapping operations in an example will now be described. In this example, texture mapping is performed on a long rectangle wall being displayed on a monitor. This wall is located in a scene so that the left end thereof is near to the viewpoint and the right end thereof is far from the viewpoint. As a result, the height of the left end of the wall is higher than the height of the right end as shown in FIGS. 21 and 22.

On this wall, four rectangular patches or sections P1, P2, P3 and P4, each having the same dimensions, are displayed in a side by side manner. According to the perspective representing method, the four sections should be viewed on the screen as shown in FIG. 22. However, if the depth is not considered for the texture mapping address MX and MY, the result is problematically represented on the screen as shown in FIG. 21.

Further, another problem is that a straight line on a texture map may be distorted on the screen, or textures mapped on an object may not be as smoothly moved on the screen as the object is actually moved as in the above-mentioned example of a video game in which an object may be rotated. In order to eliminate such problems, an image processing system in a second embodiment of the present invention performs the texture mapping operation described below.

First, the perspective transformation (which may also be called "screen transformation") is performed on the texture map address MX and MY, according to the following equivalent equations (6) or (6a):

$$MXs=MX/Ze, \quad MYs=MY/Ze \tag{6; or}$$

$$MXs=MX \cdot Zs, \quad MYs=MY \cdot Zs \tag{6a}$$

MXs and MYs are the texture map addresses on the screen. Then, the image data including the texture map address for pixels are obtained from the image data for polygons as a result of expanding the image data using the DDA.

The inverse perspective transformation is then performed on the texture map address (MXs, MYs) of the thus-obtained image data for pixels, according to the following equations (7):

$$MX=MXs/Zs, \quad MY=MYs/Zs \tag{7}$$

Zs is the Z value of the image data for the pixels. As a result of performing the above-mentioned operations, it is possible to perform the texture mapping operations considering the depth.

With reference to FIG. 6, a general structure of the image processing system in the second embodiment will now be described. Similar to the first embodiment, the microprocessor unit 1 performs the coordinate transformation, shading, clipping and transfers the screen coordinate values Xs, Ys, Zs, MXs, MYs and luminance values (I) to the edge expanding circuit 2 in the DMA transfer method. At this time, each flag such as, for example, a flag for flat shading or a flag for Gouraud shading is also transferred. Further, the microprocessor unit 1 includes hardware particularly suited for the affine-transformation and the DMA transfer. The microprocessor unit 1 performs the perspective transformation operation of the Z values. Further, the unit 1 may also perform the operation of the equations (6). However, as described below, it is preferable that the subsequently provided edge expanding circuit 2 performs the operation of the equations (6a).

The microprocessor unit 1 transfers the image data to the edge expanding circuit 2 in the DMA transfer method polygon by polygon. However, by such polygon by polygon transfer, as mentioned above, either a lot of time is required or it is necessary to provide special control circuits for reducing the required time. Also in the second embodiment of the present invention, the RGF 23 shown in FIG. 3 is provided in the edge expanding circuit 2 and stores image data for several polygons or more at the same time.

The edge expanding circuit 2 uses (in a case where each polygon has a rectangular shape, for example) the image data of four end points of each polygon supplied by the microprocessor unit 1. Identification numbers of the four end points are 0, 1, 2, and 3 as shown in FIG. 5, and the relevant four items of image data also have the same identification numbers 0–3, respectively. The circuit 2 interpolates the four end points for each polygon as described above with reference to FIG. 5, and divides the interpolated image data into image data for left edges (an identification number of which data is "0") and image data for right edges (an identification number of which data is "1") of each polygon shown in FIG. 5.

Figure 7:
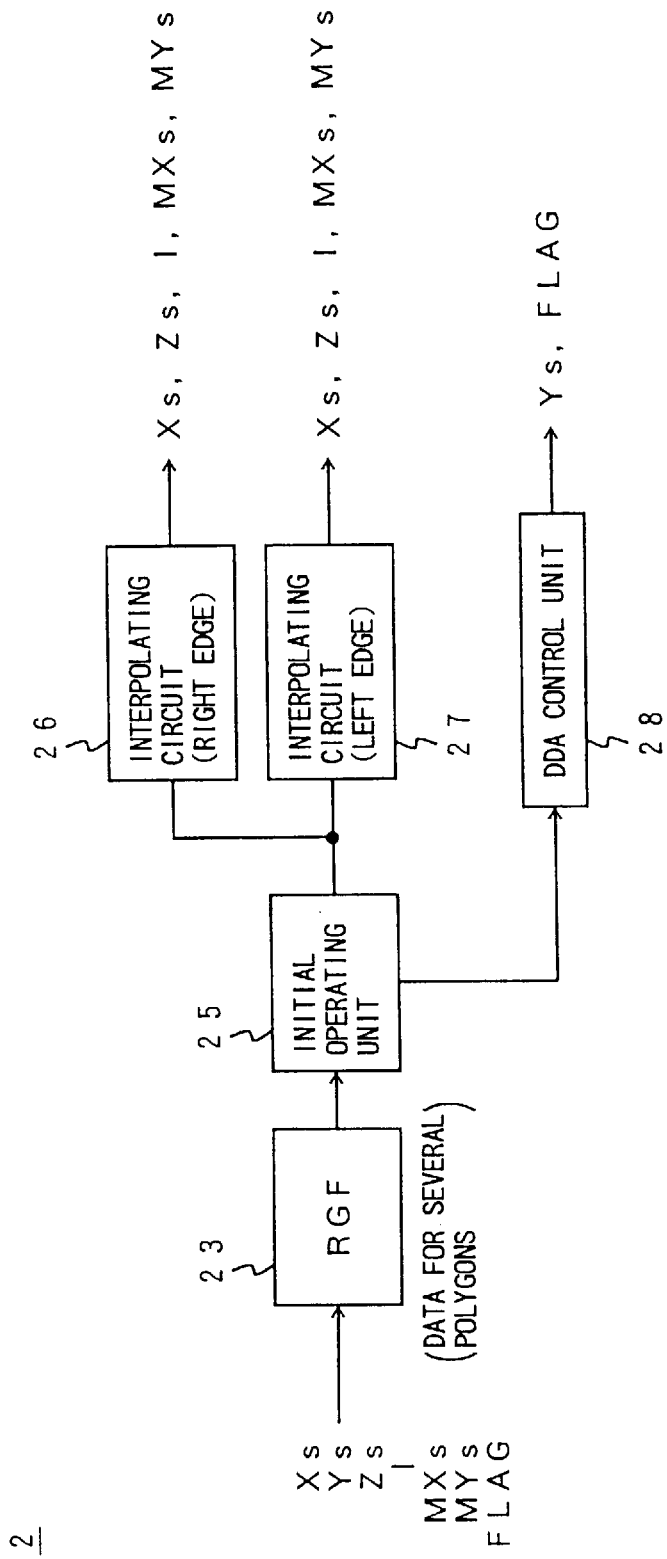
FIG. 7 shows a block diagram of an example of the edge expanding circuit used in the system shown in FIG. 6.

The edge expanding circuit 2 is shown in block diagram in FIG. 7. This diagram is similar to that showing the edge expanding circuit 2 in FIG. 4. However, the initial operating circuit 25*a* in the second embodiment, in addition to the shift operation such as that performed by the structure shown in FIG. 2, performs the perspective transformation of the equations (6a) on (MX, MY) so as to obtain (MXs, MYs) as described later. The initial operating circuit 25*a* is shown in block diagram in FIG. 8.

The RGF 23 which temporarily stores the data for several polygons transferred from the microprocessor unit 1 transfers the data to the initial operating circuit 25*a* polygon by polygon. First, a barrel shifter 250 shown in FIG. 8 performs the shift operation of the Z values. An MXs, MYs operating unit 251 multiplies Zs and MX together and Zs and MY together, and thus converts (MX, MY) to (MXs, MYs). Thus, the conversion from (MX, MY) to (MXs, MYs) is performed in the operating unit 251 in the edge expanding circuit 2 and is not performed in the microprocessor unit 1. This is because use of the Zs which have undergone the perspective transformation in the microprocessor unit 1, for the operation of the equations (6a) in the edge expanding circuit 2, can improve the accuracy of the resulting (MXs, MYs) and also can reduce the number of data bits for representing each value of the MXs and MYs, as compared to the operation of the equations (6) performed in the microprocessor unit 1.

Figure 8:
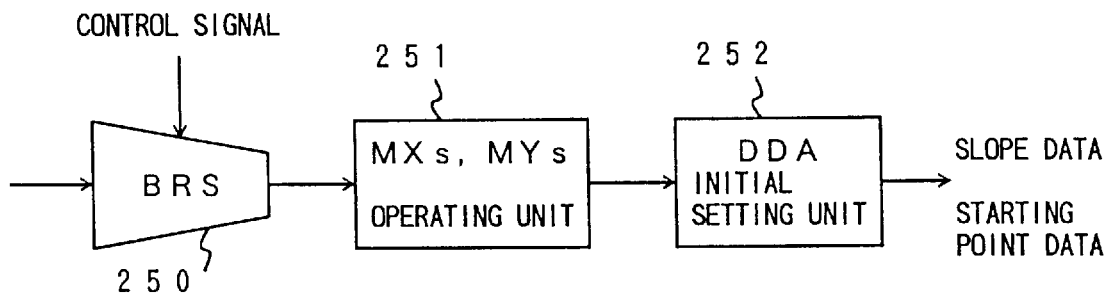
FIG. 8 shows a block diagram of an example of an initial operating circuit used in the system shown in FIG. 6

A DDA initial setting unit 252 shown in FIG. 8 examines the Y values, identifies data for left edges and data for right edges, and calculates slope data. The slope data is data indicating a rate of gradation at which a value of each parameter varies and is obtained, for example, for the Xs on the right edge between a vertex 0 and a vertex 1 of the polygon shown in FIG. 5 through the following expression:

(Xs1−Xs0)/(Ys1−Ys0), where (Xs0, Ys0) are the coordinates of the vertex 0 and (Xs1, Ys1) are the coordinates of the vertex 1.

The slope data and starting point data, which is data indicating a starting point such as the vertex 0 in the above-mentioned example, for each parameter (Xs, Ys, Zs, I, MXs, MYs) are transferred to the interpolating circuit 26 for the right edges and the interpolating circuit 27 for the left edges.

Figure 9:
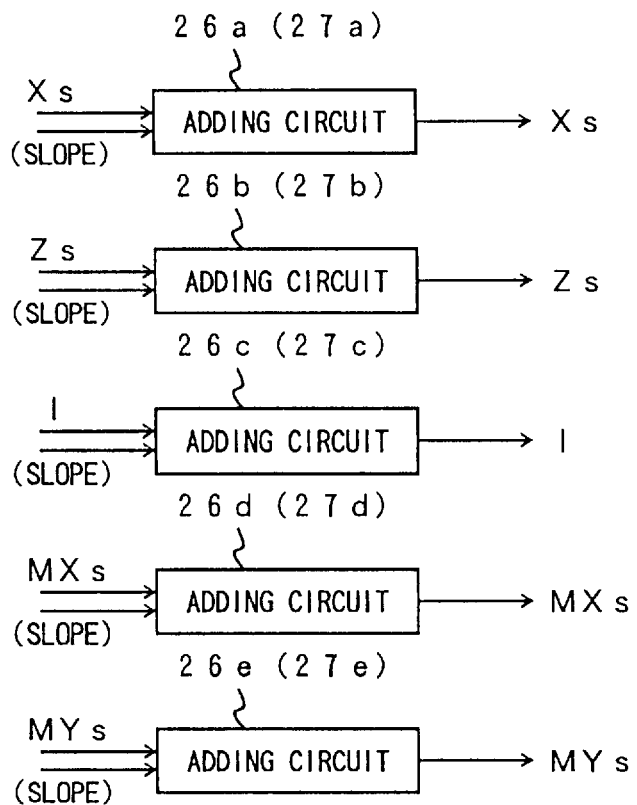
FIG. 9 shows a block diagram of an example of an interpolating circuit used in the system shown in FIG. 6

With reference to FIG. 9, the interpolating circuits 26 and 27 including adding circuits will be described. The interpolating circuits 26 and 27 interpolate Xs, Zs, I, MXs, and MYs of the image data. Because Ys of the image data corresponds to each scan line, Ys is merely incremented by one. Therefore, calculation of Ys is performed through the DDA control unit 28 shown in FIG. 7. Each of the interpolating circuits 26 and 27 includes adding circuits 26*a* or 27*a*, 26*b* or 27*b*, 26*c* or 27*c*, 26*d* or 27*d*, and 26*e* or 27*e*, as shown in FIG. 9, for performing interpolating operations so as to obtain Xs, Zs, I, MXs, and MYs, respectively, on the right edges or the left edges of each polygon.

Figure 10:
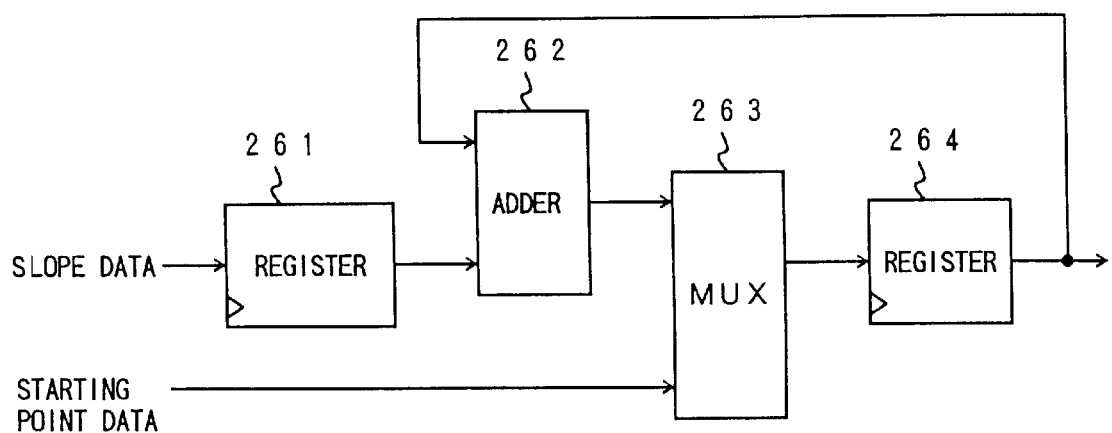
FIG. 10 shows a block diagram of an example of an adding circuit used in the interpolating circuit.

With reference to FIG. 10, each of the adding circuits shown in FIG. 9 will now be described. The adding circuit includes a register 261 which stores therein the slope data calculated by the DDA initial setting unit 252. The register 261 supplies the stored data to an adder 262. The starting point data and data output from the adder 262 are supplied to a multiplexer 263. Data output from the multiplexer 263 is stored in a register 264 which supplies the stored data to the adder 262. In this circuit, the starting point is stored in the register 264 via the multiplexer 263, and the thus-stored starting point data and the slope data stored in the register 261 are added together by the adder 262. The addition result is then supplied to the register 264 via the multiplexer 263. Thus, the interpolating operation is performed and the interpolation result is output from the register 264. Subsequently, the previous interpolation result and the slope data are added together by the adder 262. Thus, the interpolating operation is successively performed. As a result, the interpolating operations are performed through each edge, of the right edges and left edges of each polygon, from the starting point to the ending point. Thus, the edge expanding operation is performed.

Figure 11:
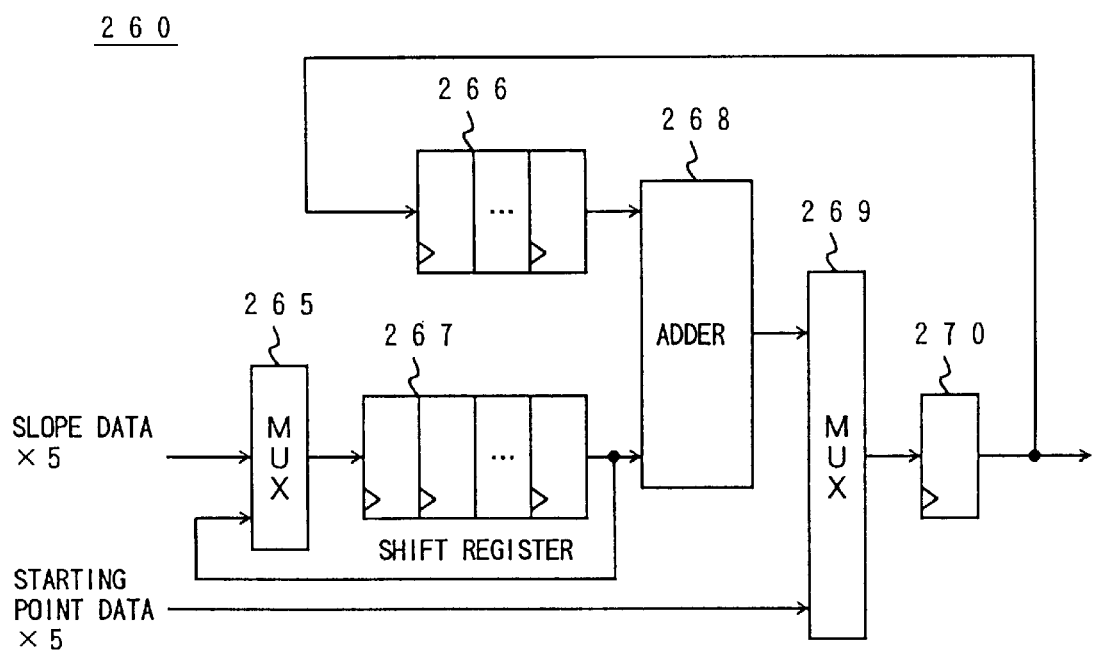
FIG. 11 shows a block diagram of an example of an adding circuit which interpolates multiple parameters of image data used in the interpolating circuit.

Unless the pixel expanding circuit 3 has a function of performing a parallel pixel expanding operations, the frequency of the above-described adding cycles performed by the circuit shown in FIG. 10 is less than the frequency of similar adding cycles performed by the pixel expanding circuit 3. Therefore, it is not necessary to perform the adding operations for all parameters (Xs, Zs, I, MXs, and MYs) in parallel. It is possible to perform the adding operations for all parameters (Xs, Zs, I, MXs, and MYs) one by one. With reference to FIGS. 11 and 12, an adding circuit 260 performing the adding operations for all parameters one by one will now be described. This adding circuit 260 acts as each of the interpolating circuits 26 and 26 shown in FIG. 7.

The five items of slope data for the five parameters (Xs, Zs, I, MXs, and MYs) provided to a multiplexer 265 are supplied to a shift register 267. The shift register 267 stores the five items of slope data at the same time, and supplies each item of the five items of slope data item by item as the items are again supplied to the shift register 267 via the multiplexer 265. Thus, the shift resister 267 supplies each item of the once stored five items of slope data item by item to an adder 268.

The five items (Xs, Zs, I, MXs, and MYs) of starting point data are supplied to a multiplexer 269 which supplies the five items of data to a shift register 266 via a register 270. The register 270 and shift register 266 together store the five items of data at the same time. The shift register 266 supplies each item of data item by item as each item of the output data of the adder 268 is supplied to the register 270 and then the shift register 266 item by item via the multiplexer 269 and register 270. The multiplexer 269 repeats a cycle of supplying the five items of output data of the adder 268 item by item after completion of the above-discussed supply of the five items of the starting point data.

Then, the register 270 and shift register 266 together store the five items of output data of the adder 268 at the same time, and the shift register 266 supplies each item of the five items of data item by item as each items the five items of output data of the adder 268 is supplied to the register 270 and then to the shift register 266. Thus, the shift resister 266 supplies each item of the five items of starting point data item by item and then repeats a cycle of supplying the five items of output data of the adder 268 item by item, to the adder 268.

The adder 268 adds the thus-supplied items of slope data and items of starting point data or output data from the adder 268. Thus, the adder 268 first adds each item of the slope data and a respective item of the starting data and then adds each item of the slope data and a respective item of the output data from the adder 268.

Thus, the interpolating operations of the five parameters are successively performed. By applying such a circuit arrangement, it is possible to reduce circuit size. Further, it is possible to provided one common dividing circuit for the five parameters, the dividing circuit being used for obtaining the slope data.

The pixel expanding circuit 3 interpolates image data for pixels present along a line extending along a scan line between each starting point and a respective ending point of each parameter. The starting points are image data supplied by the interpolating circuit 27 for the left edges and the ending points are image data supplied by the interpolating circuit 26 for the right edges. The principle of the interpolation is the same as that of the interpolation performed by the edge expanding circuit 2.

With reference to FIG. 13, the pixel expanding circuit 3 will now be described. An initial operating unit 31 calculates an initial value of the slope data for each parameter and supplies the initial values to an interpolating circuit 32. The interpolating circuit 32 is shown in block diagram similar to that showing the above-described adding circuit 260, and interpolates image data for pixels present between the starting points and the ending points for each scan line.

The inverse perspective transformation is performed on the parameters MXs and MYs among the five parameters of the thus-interpolated image data for pixels so as to obtain MX and MY for the pixels, through an inverse transforming circuit 33.

Figure 14:
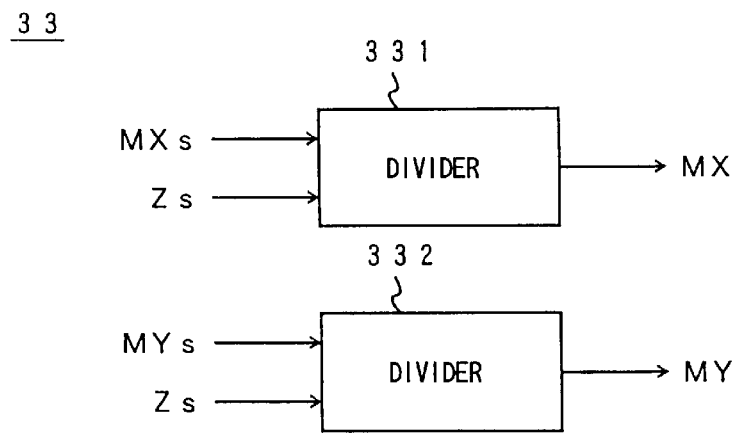
FIG. 14 shows a block diagram of an inverse transforming circuit used in the pixel expanding circuit shown in FIG. 13.

With reference to FIG. 14, the inverse perspective transforming circuit 33 will now be described. The inverse perspective transforming circuit 33 performs operations of the above-mentioned equations (7) and includes two dividers 331 and 332 for MXs and MYs, each of which is a one by one calculating type divider.

Figure 15:
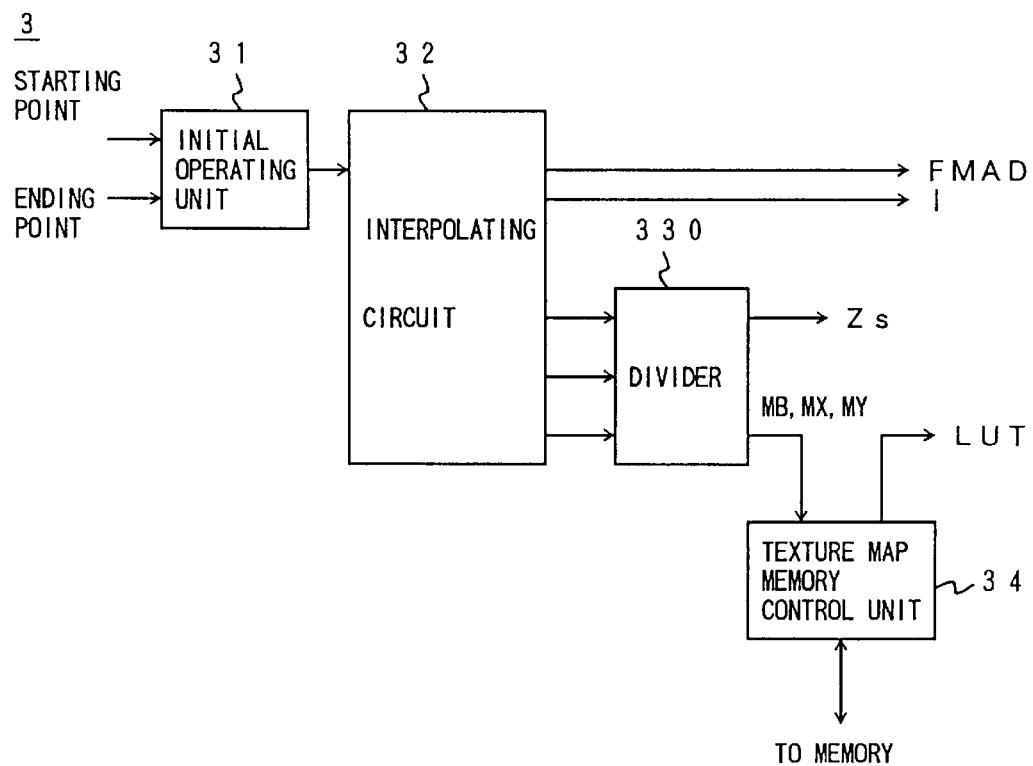
FIG. 15 shows a block diagram of another example of a pixel expanding circuit used in the system shown in FIG. 6.
Figure 16:
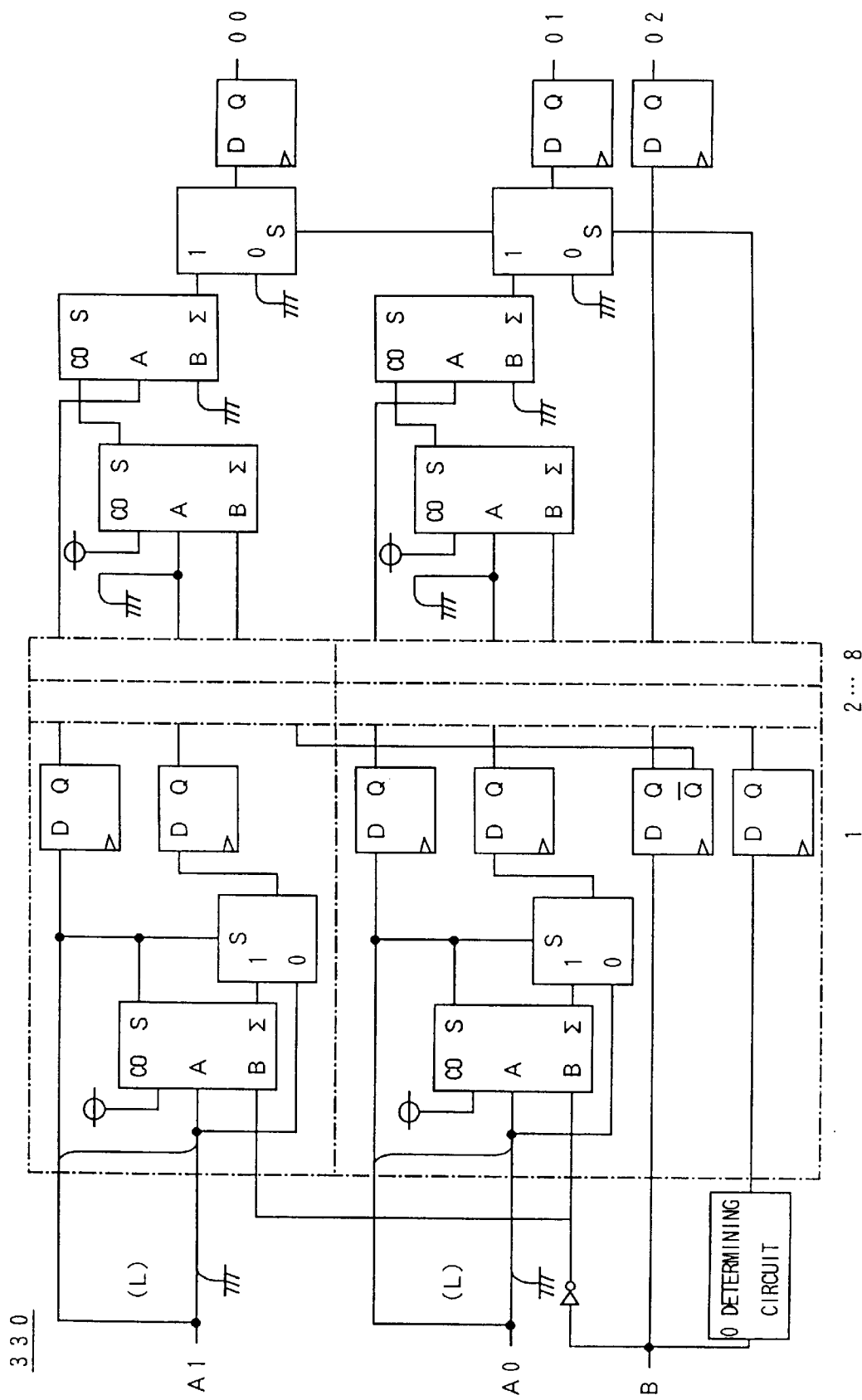
FIG. 16 shows a circuit diagram of a two-numerator one-denominator divider used in the pixel expanding circuit shown in FIG. 15.

In the equations (7), there are two numerators, MXs and MYs, and only one denominator, Zs. Therefore, by using the divider 330 shown in FIG. 16, it is possible to miniaturize the scale of the circuit. The divider 330 is a two-numerator one-denominator divider. FIG. 15 shows the pixel expanding circuit using the divider 330. This divider 330 includes a circuit for rounding off decimal portions of the division results. Further, because the Zs data used as the denominator is output together with a result of the division, it is not necessary to provided a shift register for temporarily storing the Zs data.

A texture map memory control unit 34 uses the thus-obtained texture map address MX and MY and a texture map block number (MB) included in the flag for each pixel and reads a lookup table address (LUTAD) from the texture mapping memory 4 for the pixel. The texture map memory control unit 34 supplies the thus-obtained LUTAD to the color operating circuit 5.

Further, the interpolating circuit 32 shown in FIG. 13 and FIG. 15 outputs frame-memory address data (FMAD) which indicates addresses in the frame memory 9 and correspond to the pixels to be displayed on the screen. The FMAD are obtained as a result of interpolating coordinate data (Xs, Ys) for the pixels present between each starting point and a respective ending point for a respective scan line. Further, the interpolating circuit 32 interpolates the luminance data I for the pixels and outputs it.

With reference to FIG. 19, the color operating circuit 5 will now be described. A LUT address control unit 55 accesses the lookup table memory 6 in accordance with the LUTAD. As a result, color information (R, G, B) is obtained from the lookup table memory 5 for each pixel, the color information being supplied to an R operating unit 52, a G operating unit 53 and a B operating unit 54. Further, a register (not shown in the figure) supplies predetermined color information (FR, FG, FB) which indicates color component values relevant to the maximum value of the luminance data I to the R operating unit 52, G operating unit 53 and B operating unit 54, respectively. Then, the R operating unit 52, G operating unit 53 and B operating unit 54 perform the color operations so as to obtain color information (R, G, B) depending on the luminance data I. These color operations are performed in accordance with operation sequences such as that shown in FIG. 17, which indicates an operation sequence, for example, for the color R, using a graph such as that shown in FIG. 18 which indicates a relationship between the luminance I and, for example, the color R component.

Figure 18:
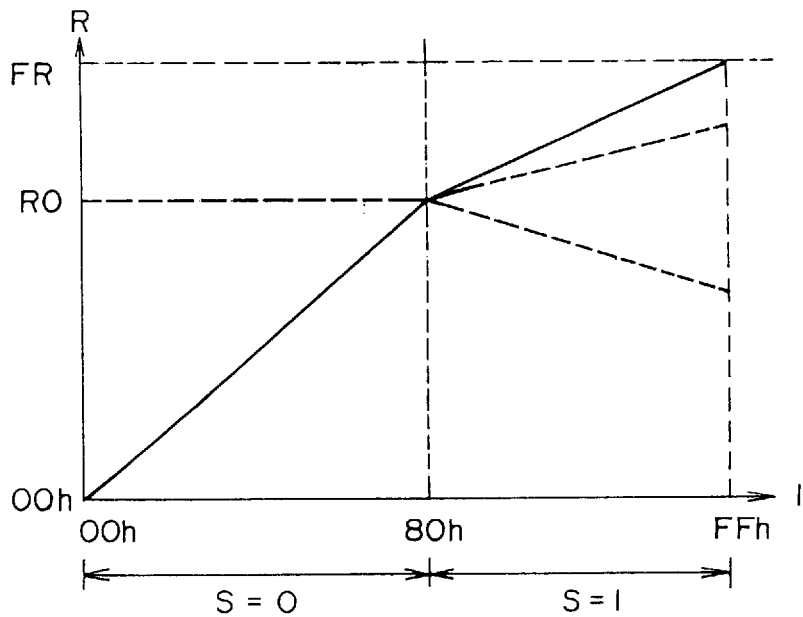
FIG. 18 shows a graph indicating a relationship between a luminance and a color.

In FIG. 18, the value of the R color data input to the R operating unit 52 shown in FIG. 19 is referred to as Ro. According to the graph shown in FIG. 18, when the luminance I=80(h), wherein "h" represents the hexadecimal notation, a value the same as the input value Ro is output from the R operating unit 52 for the color R component. As the luminance I is reduced from 80 h to 00 h, the output value of the color component is reduced from the Ro to 00 h. As the luminance I is increased from 80 h to FFh, the output value of the color component is reduced from the Ro to FR.

Figure 17:
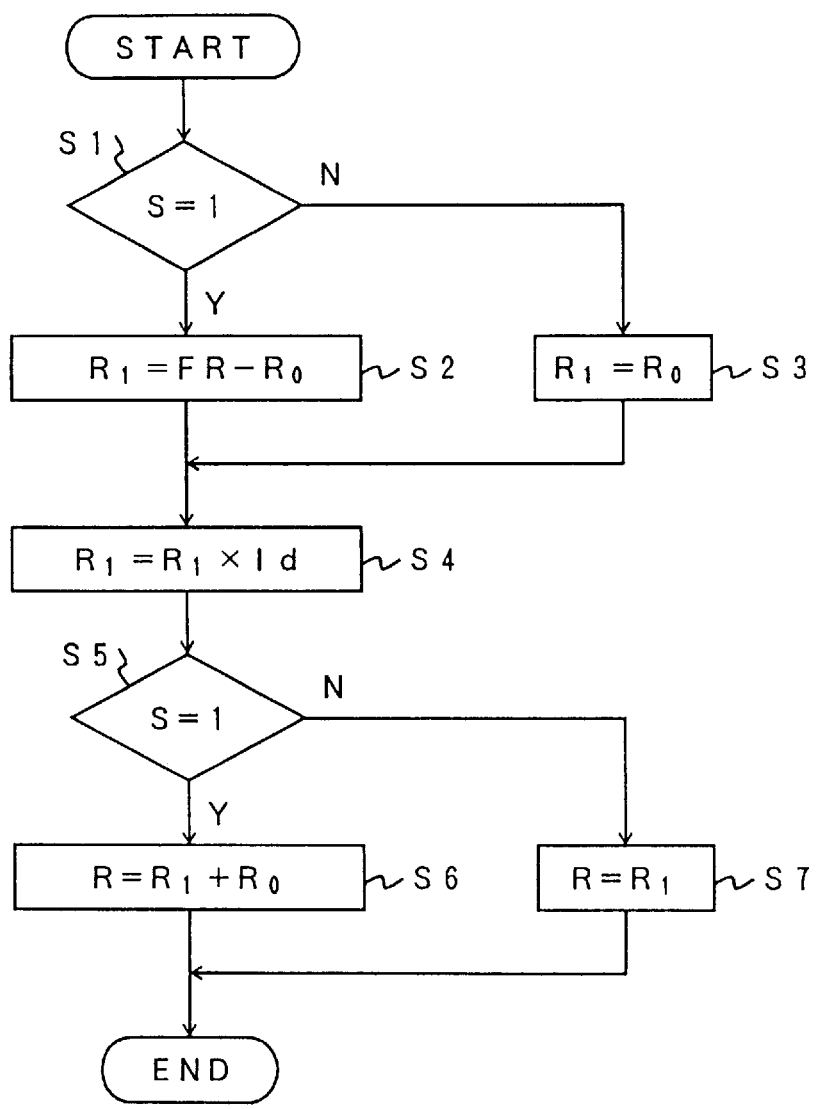
FIG. 17 shows an operation flowchart of an operation performed by a color operating unit used in a color operating circuit shown in FIG. 19.

With reference to FIGS. 17 and 18, the color operation performed by the R operating unit 52 will now be described. In a step (which term "step" will be omitted, hereinafter) S1, it is determined whether or not the luminance I is not less than 80 h, that is, whether or not S=1 shown in FIG. 18. If I is not smaller than 80 h, S2 subtracts the color component value Ro from FR. S4 multiplies the result of the subtraction and the least significant 7 bits (Id) of the value of I. Then, S5 also determines that S=1 accordingly, and S6 adds $R_1$ and Ro. S4 is performed in a manner in which Id is a decimal so that R resulting from the addition in S6 may be an appropriate value in a range between Ro and FR according to the relationship shown in FIG. 18. The resulting R is used as the color component information R depending on the luminance data I to be output to the memory control circuit 7.

If I is smaller than 80 h in S1, that is, S=0 in FIG. 18, S3 determines use of Ro as it is, and S4 multiplies Ro and the least significant 7 bits (Id) of the value of I. S5 also determines that S=0 and, as a result, a result R of the multiplication in S4 is used as the color component information R depending on the luminance data I to be output to the memory control circuit 7. S4 is performed in a manner in which Id is a decimal so that the resulting $R_1$ may be an appropriate value in a range between 00 h and Ro according to the relationship shown in FIG. 18

The memory control circuit 7 controls-data stored in the Z-buffer memory 8 and the frame memory 9. The memory control circuit 7 causes the frame memory 9 to store therein the R, G and B values for each pixel at a respective FMAD supplied by the pixel expanding circuit 3 as mentioned above. The R, G and B values are supplied by the color operating circuit 5 as described above. The Z-buffer memory 8 has a format the same as that of the frame memory 9. The Z-buffer memory 8 stores the Zs values which are supplied by the pixel expanding circuit 3 as mentioned above and indicates Z values of each pixel.

When the color values R, G and B are supplied by the color operating circuit 5 for each pixel, the memory control circuit 7 reads a Zs value for the corresponding pixel from the Z-buffer memory 8. Then, the memory control circuit 7 compares the Zs value supplied by the color operating circuit with the Zs value read from the Z-buffer memory 8 for the pixel.

It is assumed that Zs is determined using the equation (3). Then, if the Zs value supplied by the color operating circuit is smaller than the Zs value read from the Z-buffer memory 8 for the pixel, it is determined that the pixel having the color values currently supplied by the color operating circuit is located nearer to the viewpoint than the pixel having the color values previously stored in the frame memory. Therefore, the color values currently supplied by the color operating circuit 5 are overwritten to the frame memory at the relevant FMAD. Further, the Zs value currently supplied by the pixel expanding circuit 3 is overwritten in the Z-buffer memory 8 at the relevant address.

If the Zs value supplied by the color operating circuit is larger than the Zs value read from the Z-buffer memory 8 for the pixel, it is determined that the pixel having the color values currently supplied by the color operating circuit is located farther from the viewpoint than the pixel having the color values previously stored in the frame memory. Therefore, the color values currently supplied by the color operating circuit 5 are ignored. Further, the Zs value currently supplied by the pixel expanding circuit 3 is also ignored. Thus, the hidden-surface removal is performed.

Further, in accordance with a control signal supplied by the CRT controller 10, the memory control circuit 7 reads R, G, and B color values of a just preceding frame from the frame memory 9 and outputs them to the CRT controller 10. The CRT controller 10 sends it to the CRT via the D/A converter and the RGB encoder (not shown in the figure) in the form of a composite video signal.

Thus, the image processing system shown in FIG. 1 performs the texture mapping operation using the Z-buffer method considering the depth of the view volume.

Further, by performing operations similar to those performed on MX and MY, to the luminance values I, it is also possible to perform Gouraud shading considering the depth of the view volume. Specifically, I is converted to Is, which represents the luminance values in the screen coordinate system, through the following equation (8):

$$Is=I \cdot Zs \qquad (8).$$

Is of the pixel data is obtained as a result of performing, on Is of the polygon data, the edge expanding operation through the edge expanding circuit 2 and the pixel expanding operation through the pixel expanding circuit 3 using the DDA technique.

Then, the inverse perspective transformation is performed on Is of the pixel data so as to obtain I of the pixel data in the viewpoint coordinate system through the following equation (9):

$$I=Is/Zs \qquad (9).$$

In this case, the operation of the equation (9) is performed in addition to the operations of the above-mentioned equations (7). For this purpose, a three-numerator one-denominator divider is used as the divider 330 shown in FIG. 15 instead of the two-numerator one-denominator divider.

By performing operations by the image processing system such as that described above in parallel, it is possible to improve operation performance of the system. However, for this purpose, it is necessary to increase the number of texture mapping memories so it will accommodate a number of operation lines in the parallel operations, or to provide a high-speed memory. Thus, the scale of the system is enlarged and/or the costs required for the system are increased.

An image processing system in a third embodiment of the present invention, which will now be described with reference to FIG. 20, can solve the foregoing problem. The block diagram shown in FIG. 20 does not include a unit to the microprocessor unit 1 shown in FIGS. 1 and 6, and the polygons of image data supplied from the corresponding unit is supplied to the 3-D internal bus through the 3-D D.B. The polygons of image data are transferred to a draw data control unit. The draw data control unit, a draw RGF and a divider act as to the initial operating unit 25a shown in FIG. 7. The draw RGF corresponds to the RGF 23 shown in FIG. 7, and the divider calculates the slope data.

A substantial amount of time is required for a data processing work performed through units corresponding to the units starting from the pixel expanding circuit 3. Therefore, it is effective to have parallel lines of data processing for those units so as to reduce the time required for the data processing. In the image data processing system shown in FIG. 20, the parallel operations can be achieved using the single texture mapping memory and without using the high-speed memory.

The image processing system uses transparent mapping memories for storing only flags indicating transparence of a texture map for each pixel. When a texture map is displayed on a rectangular polygon, the texture map may not cover the entire area of the polygon. Thus, there may be a region in the polygon, which region has no color and is thus transparent. If another polygon is present behind the first polygon, a texture map of the second polygon may be finally indicated on the screen through the transparent region of the first polygon.

In the system in the third embodiment, the transparent mapping memories are used instead of the texture mapping memory 4 shown in FIG. 6. Thus, it is determined whether or not a relevant pixel is a transparent pixel using the flags stored in the transparent mapping memories. Using a result of the determination, the image data I, MB, MX and MY, instead of the R, G, B color values, is written into the frame memories for each pixel only if the pixel is not the transparent pixel. Obtaining the LUTAD from the texture mapping memory and the color operations are performed using the image data stored in the frame memories.

By applying such an operation, the parallel operations are performed using only the single texture mapping memory. Although multiple transparent mapping memories are required, the total memory capacity can be considerably reduced in comparison to using multiple texture mapping memories. In fact, the flag having only one bit can indicate the transparency of each pixel in the transparent mapping memories, but 8 bits or the like are required for indicating LUTAD for each pixel in the texture mapping memory.

Further, in the system, it is also possible to use a texture map including a transparent part similar to the above-described embodiments.

Figure 20:
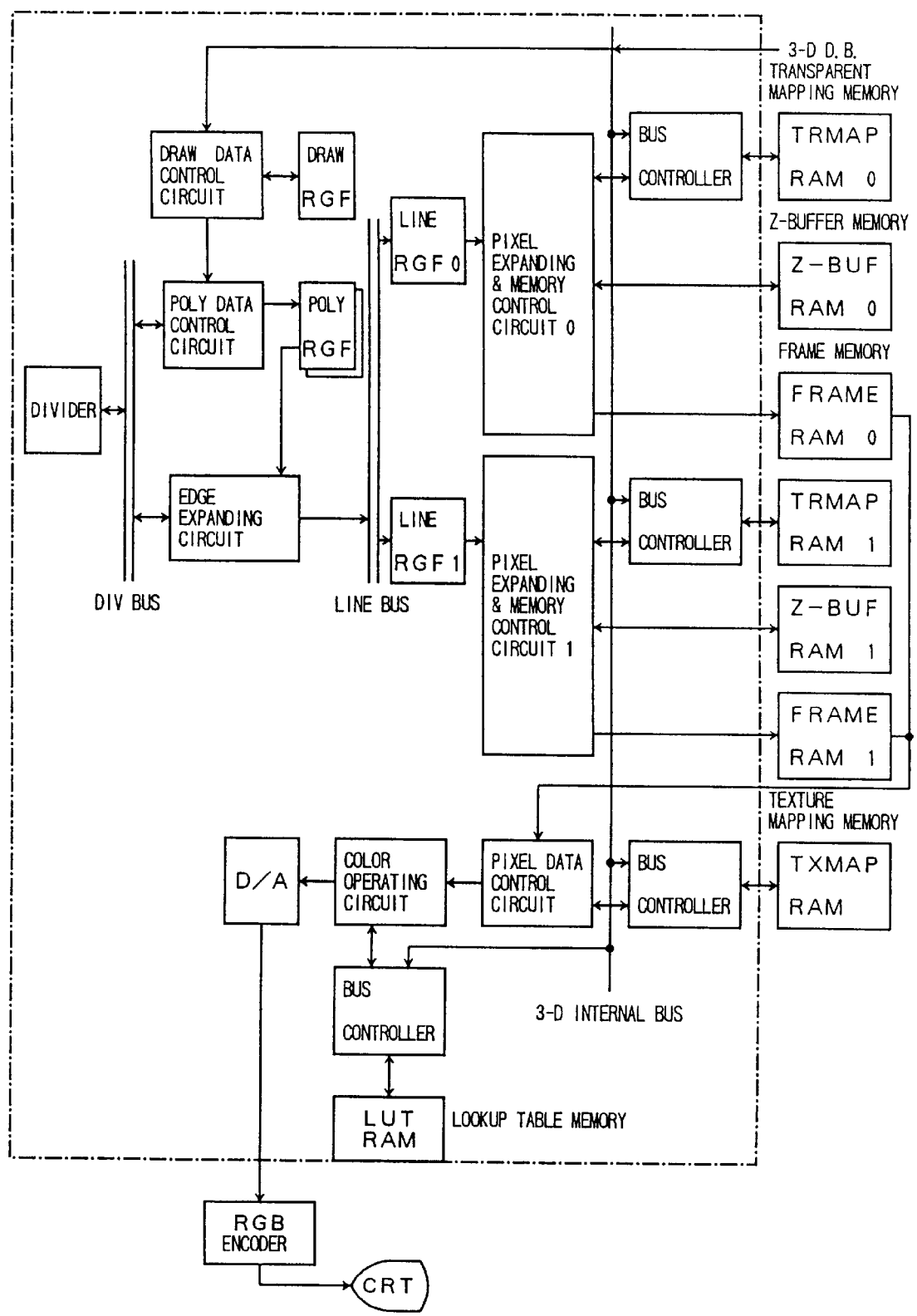
FIG. 20 shows a block diagram of an image processing system in a third embodiment of the present invention.

Further, register file devices or first-in, first-out (FIFO) devices are used as a polygon register file device (poly RGF) and a line register file device (line RGF) shown in FIG. 20. By this use, it is possible to eliminate performing useless processes.

In the system in the third embodiment shown in FIG. 20, a first series of the parallel series including the line RGF 0, pixel expanding and memory control circuit 0, Z-buffer RAM 0, and frame RAM 0 are used to process image data of pixels present on even-numbered scan lines, and a second series of the parallel series including the line RGF 1, pixel expanding and memory control circuit 1, Z-buffer RAM 1, and frame RAM 1 are used to process image data of pixels present on odd-numbered scan lines, With reference to FIGS. 23 through 28, an image processing system in a fourth embodiment of the present invention will now be described.

Figure 23:
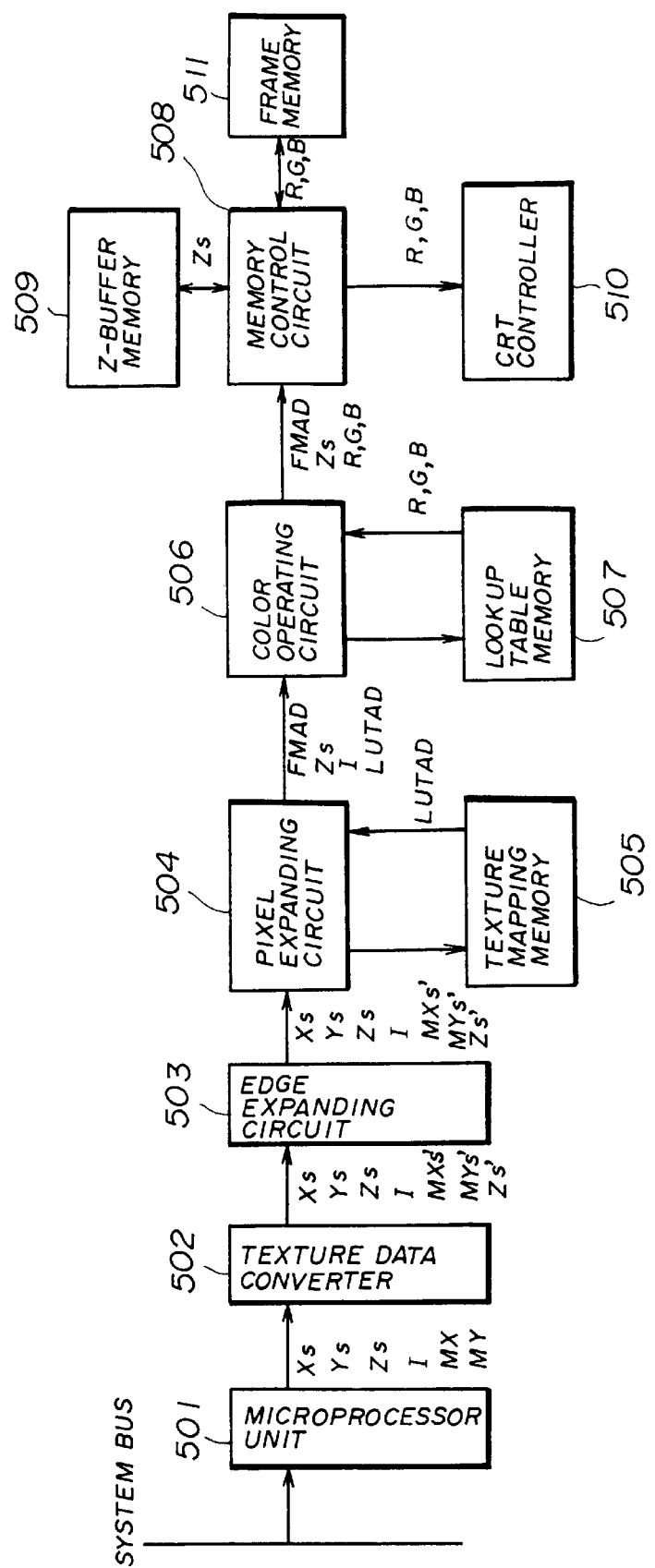
FIG. 23 shows a block diagram of a general arrangement of a fourth embodiment of the present invention.
Figure 24:
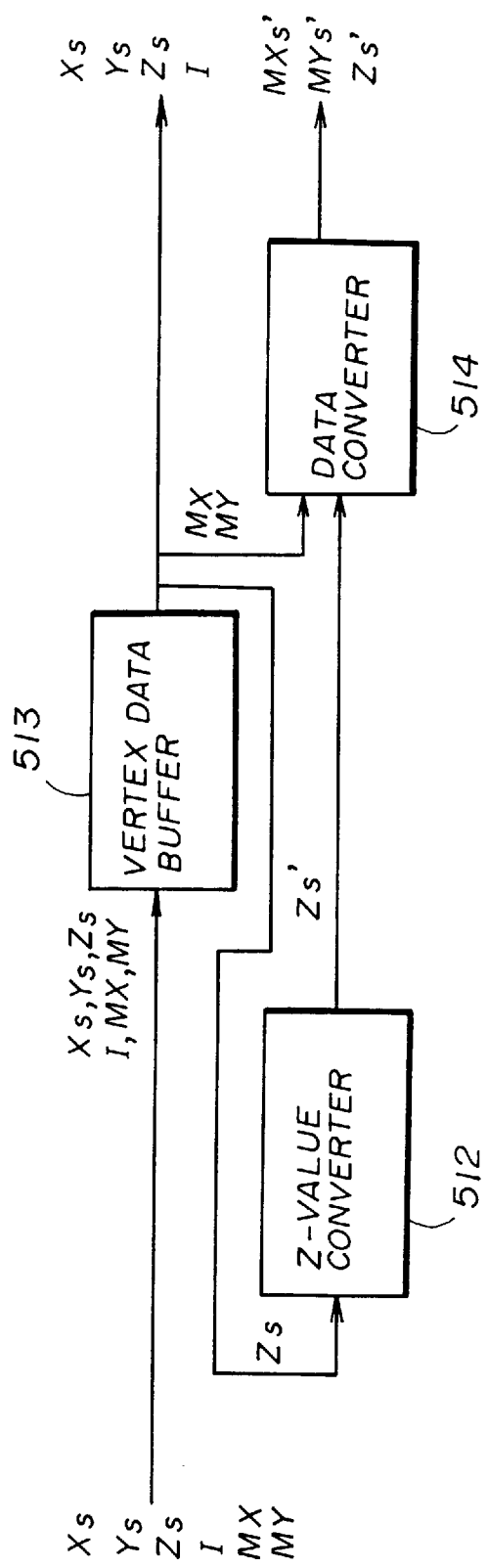
FIG. 24 shows a block diagram of a texture data converter shown in FIG. 23.
Figure 25:
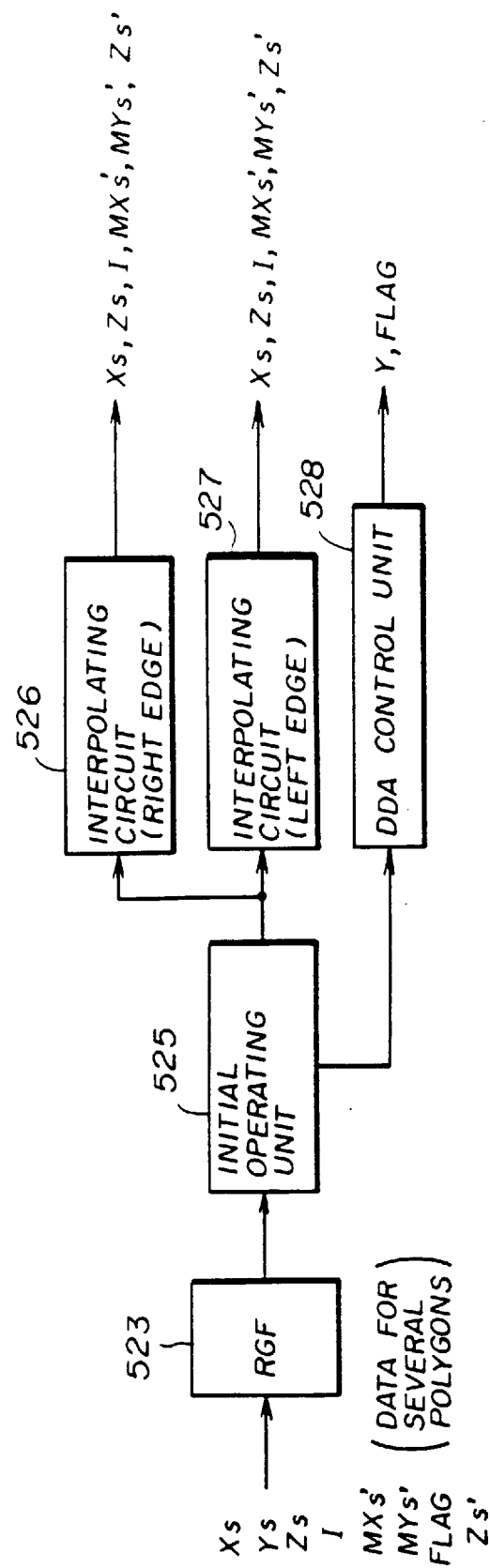
FIG. 25 shows a block diagram of an edge expanding circuit shown in FIG. 23.
Figure 26:
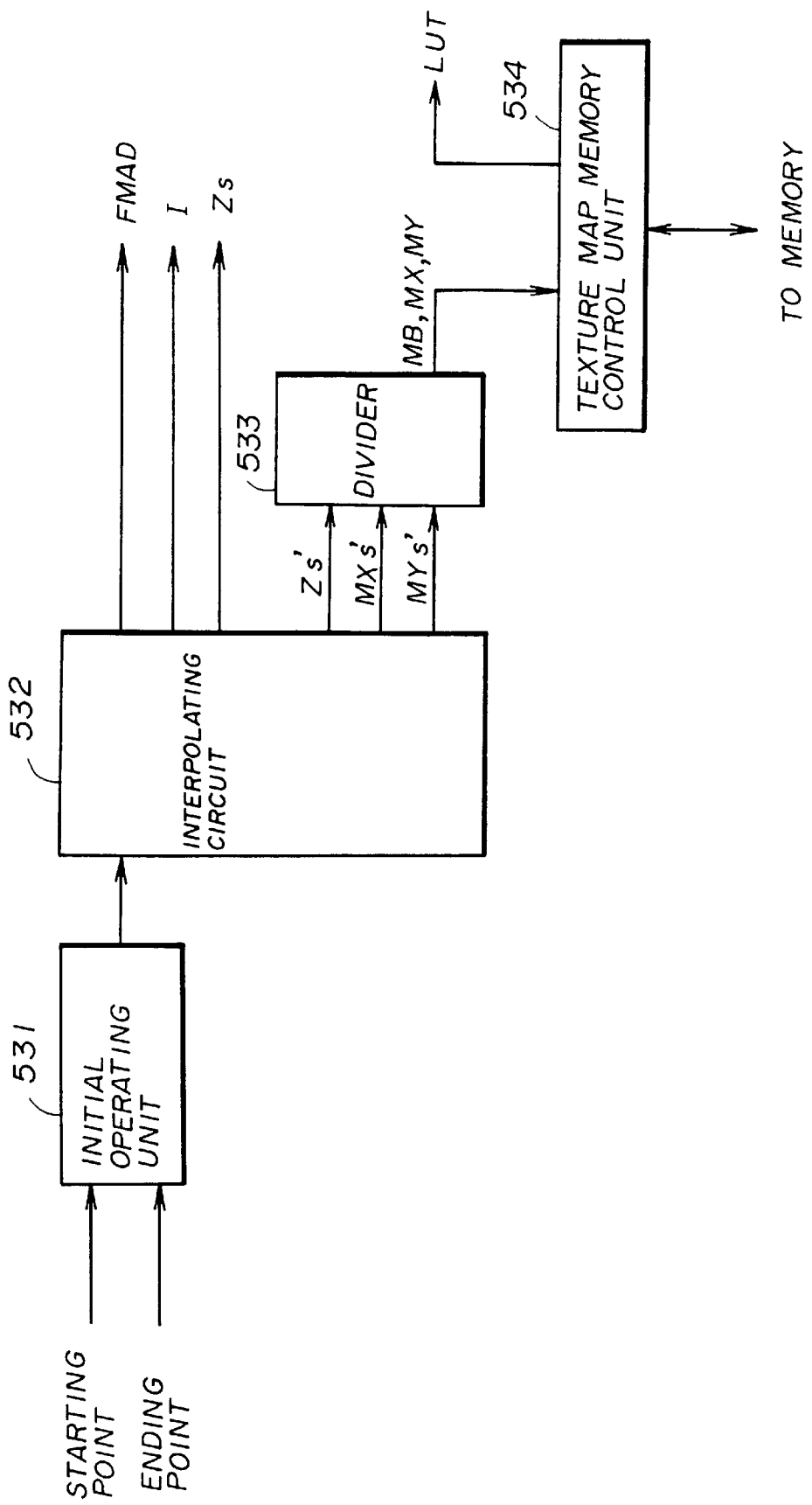
FIG. 26 shows a block diagram of a pixel expanding circuit shown in FIG. 23.
Figure 27:
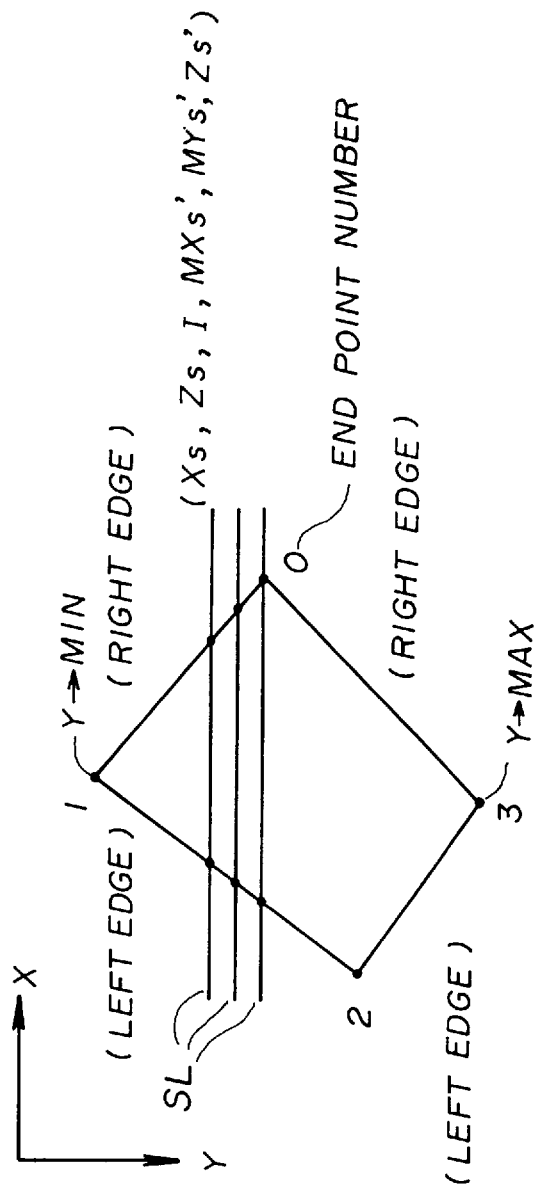
FIG. 27 illustrates polygon data used in the fourth embodiment of the present invention.
Figures 28A, 28B:
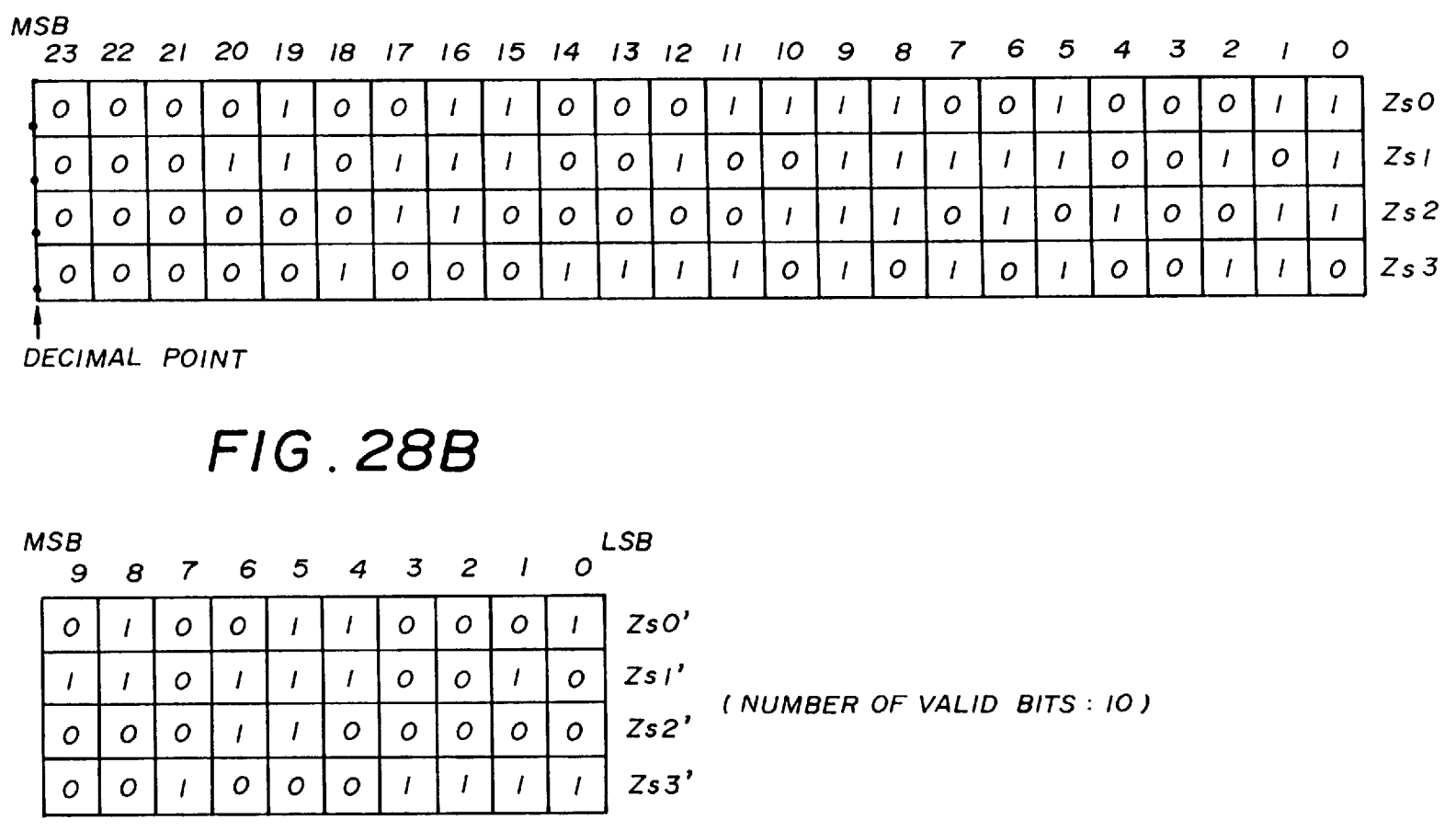

FIG. 23 shows a block diagram of a general arrangement of the fourth embodiment. FIG. 24 shows a block diagram of a texture data converter 502 shown in FIG. 23. FIG. 25 shows a block diagram of an edge expanding circuit 503 shown in FIG. 23. FIG. 26 shows a block diagram of a pixel expanding circuit 504 shown in FIG. 23. FIG. 27 illustrate polygon data used in the fourth embodiment. FIGS. 28A and 28B illustrate depth information conversion in the fourth embodiment.

A microprocessor unit 501 shown in FIG. 23 performs the perspective transformation of input image data from the viewpoint coordinate system to the screen coordinate system. As described above, in a case of using the Z-buffer method, it is necessary to perform the perspective transformation not only on X and Y values but also Z values.

As described above, the method of performing the perspective transformation on Z values has been proposed. In this method, the depth-direction range of the view volume is made as short as possible, the Z-values are normalized between 0 and 1, Zs represents a Z value in the screen coordinate system, Ze represents the Z value in the viewpoint coordinate system, CZF represents the Z-value of the front clipping plane of the view volume, CZB represents the Z value of the back clipping plane of the view volume, $$a=CZB/(CZB-CZF).$$

The perspective transformation is performed based on the following equation (10):

$$Zs=Z/W=(A \cdot Ze+B)/C \cdot Ze = a(1-CZF/Ze) \qquad (10).$$

In a case where many objects are displayed such as in the case of a video game, it is necessary to have a large distance between CZF and CZB.

In this case, because CZB>>CZF, the above equation (10) can be expressed by the following equation (11):

$$Zs=1-CZF/Ze \qquad (11).$$

In the fourth embodiment, the microprocessor unit 501 performs the perspective transformation based on the equation (10). However, if the distance between CZF and CZB is large, the microprocessor unit 501 performs the perspective transformation based on the equation (11). Thus, an appropriate one of the two equations (10) and (11) is selected according to the relationship between CZF and CZB, the selected one being used in the perspective transformation performed by the microprocessor unit 501.

A X value and a Y value (Xs and Ys) in the screen coordinate system are calculated by the following equations (12) and (13):

$$Xs=Xe \cdot d/Ze \qquad (12);$$

$$Ys=Ye \cdot d/Ze \qquad (13);$$

where Xe and Ye represent a X value and a Y value in the viewpoint coordinate system respectively and 'd' represents the distance between the viewpoint and the screen.

A texture data converter 502 is connected to the microprocessor unit 501 as shown in FIG. 23 and performs conversion of input texture data. The microprocessor unit 501 inputs perspective-transformation performed Xs, Ys, Zs, MX, MY (texture map data) and I (luminance data) to the texture data converter 502.

In the texture data converter 502, as shown in FIG. 24, a vertex data buffer 513 stores the input the data and appropriately supplies the data to a Z-value converter 512 and a data converter 514. The Z-value converter 512 supplies output data to the data converter 514.

The data Xs, Ys, Zs, MX, MY and I is input to the texture data converter 502 for vertices of a polygon which is processed. The input data is temporarily stored in the vertex data buffer 513. First, Zs data is read out from the vertex data buffer 513 and input to the Z-value converter 512. The Z-value converter 512 obtains a maximum Z value of Z values of the vertices of the polygon. The Z value converter 512 converts the input Zs data into Zs' data having bits, a number of the bits corresponding to a predetermined number of valid bits. The resulting Zs' data is input to the data converter 514. The predetermined number of valid bits can be selectively decided to be a desired value.

For example, a case will now be assumed, where the image processing system processes a quadrilateral (four-sided figure) polygon such as that shown in FIG. 27. In this case, it is also assumed that Zs0, Zs1, Zs2, and Zs3 are input for the four vertices of the quadrilateral polygon as the input Zs data such as those shown in FIG. 28A. As shown in FIG. 28A, each value of Zs0, Zs1, Zs2, and Zs3 values is expressed by 24 bits less than the decimal point. In this case, the maximum Z value is Zs1 and bit "1" first appears at 20th bit in Zs1 as shown in FIG. 28A. In this case, if the predetermined number of valid bits is 10, the Z-value converter 512 supplies, as Zs' data, Zs0', Zs1', Zs2' and Zs3' shown in FIG. 28B. Each value of Zs0', Zs1', Zs2' and Zs3' is expressed by 10 bits corresponding to 20th through 11th bits of a respective one of Zs0, Zs1, Zs2 and Zs3.

The data converter 514 shown in FIG. 24 uses the converted data Zs' from the Z-value converter 512 and texture map data MX and MY read out from the vertex data buffer 513. In use of the data, the data converter 514 calculates MXs' and MYs' using the following equations (14) and (15):

$$MXs'=MX \cdot Zs' \qquad (14); \text{ and}$$

$$MYs'=MY \cdot Zs' \qquad (15).$$

The data converter 514 of the texture data converter 502 supplies the converted MXs', MYs' and Zs' to the edge expanding circuit 503. Further, the perspective-transformation performed Xs, Ys, Zs and I are output by the vertex data buffer 513 of the texture data converter 502 to the edge expanding circuit 503.

In the edge expanding circuit 503, as shown in FIG. 25, an initial operating unit 525 which performs an initial operation is connected to a register file device 523. Further, an interpolating circuit 526 which performs interpolation of polygon right edge data, an interpolating circuit 527 which performs interpolation of polygon left edge data and a DDA control unit 528 which controls DDA data transfer are connected to the initial operating unit 525. The pixel expanding circuit 504 which performs pixel expanding is connected to the edge expanding circuit 503.

The screen coordinate values Xs, Ys and Zs from the texture data converter 502, texture map data MXs', MYs' and Zs' converted by the texture data converter 502 and luminance data I are transferred through DMA (Directory Memory Access) to the register file device 523 in the edge expanding circuit 503. Simultaneously, flags given to the polygons such as flat shading flags or Gouraud shading flags, for example, are also transferred to the RGF 523. The data is input to the initial operation unit 525 from the register file device 523. The initial operating unit 525 performs the initial operation such as a shift operation.

The edge expanding circuit 503 expands polygon image data of the input data into image data of left edges and image data of right edges such as those shown in FIG. 27. A shape of the polygon is not limited to a four-sided figure shown in FIG. 27 and may be any polygon. The image data for right edges is input to an interpolating circuit 526 which interpolates points present along each edge between two end points through DDA. The interpolating circuit 526 transfers the thus-interpolated point data Xs, Zs, I, MXs', MYs', Zs' to the pixel expanding circuit 504. Similarly, the image data for left edges is input to an interpolating circuit 527 which interpolates points present along each edge between two end points through DDA. The interpolating circuit 527 transfers the thus-interpolated point data Xs, Zs, I, MXs', MYs', Zs' to the pixel expanding circuit 504. Further, the DDA control unit 528 outputs scan line data, that is, Y data and flags.

In the pixel expanding circuit 504, as shown in FIG. 26, an interpolating circuit 532 which performs an interpolating operation is connected to an initial operating unit 531. A divider 533 is connected to the interpolating circuit 532. A texture map memory control circuit 534 is connected to the divider 533.

The pixel expanding circuit 504 performs, for each pixel, calculation of the following equations (16) and (17):

$$MX = MXs'/Zs' \quad (16); \text{ and}$$
$$MY = MYs'/Zs' \quad (17).$$

Thus, addresses of the texture mapping memory 504 are produced.

In this case, a number of bits which represent each value of the input data MXs', MYs' and Zs' is smaller than that of the corresponding data MXs, MYs and Zs. The data MXs, MYs and Zs is that input to the above-mentioned divider 330 shown in FIG. 15. The smaller number of bits of the Zs' results from the data conversion performed by the texture data converter 502 described with reference to FIGS. 28A and 28B. The smaller numbers of bits of the MXs' and MYs' results from the data calculation performed by the texture data converter 502 using the above-mentioned equations (14) and (15) using the Zs' value. By decreasing the numbers of bits of the MXs', MYs' and Zs', a number of bits of the divider 533 can be reduced accordingly.

The pixel expanding circuit 504 uses image data of each pair of points (of a respective right edge and a respective left edge) of the point data transferred from the two interpolating circuits 526 and 527. The pixel expanding circuit 504 interpolates a straight line between each pair of points in parallel to scan lines SL shown in FIG. 27. Accordingly, image data for pixels present on the thus-interpolated straight line is obtained. Then, using texture map addresses (MX, MY) of the thus-obtained image data for pixels as being addresses of the texture mapping memory 505, the pixel expanding circuit 504 accesses the texture mapping memory 505. The pixel expanding circuit 504 thus obtains, from the texture mapping memory 505, texture data according to address values indicated by data output from the pixel expanding circuit 504, and outputs it to a color operating circuit 506. The texture data is lookup table address data (abbreviated to LUTAD).

The color operating circuit 506 accesses the lookup table memory 507 using the LUTAD and thus obtains color information (R, G. B) of each pixel from the lookup table memory 507. Then, the color operating circuit 506 performs predetermined color operations using the color information R, G, B and thus obtains R, G and B values.

A memory control circuit 508 is connected to the color operating circuit 506, and a Z-buffer memory 509, a CRT controller 510 and a frame memory 511 are connected to the memory control circuit 508.

The memory control circuit 508 controls data stored in the Z-buffer memory 509 and a frame memory 9. The frame memory 511 stores the R. G and B values of each pixel and the Z-buffer memory 509 has a format the same as that of the frame memory 511. The Z-buffer memory 509 stores the Zs values which are supplied by the pixel expanding circuit 504 as mentioned above and indicates Z values of each pixel.

When the color values R, G and B are supplied by the color operating circuit 506 for each pixel, the memory control circuit 508 reads a Zs-value for the corresponding pixel from the Z-buffer memory 509. Then, the memory control circuit 508 compares the Zs value supplied by the color operating circuit 508 with the Zs value read from the Z-buffer memory 509 for the pixel.

For example, it is assumed that Zs is determined using the equation (11). If the Zs value supplied by the color operating circuit 508 is smaller than the Zs value read from the Z-buffer memory 509 for the pixel, it is determined that the pixel having the color values currently supplied by the color operating circuit is located nearer to the viewpoint than the pixel having the color values previously stored in the frame memory. Therefore, the color values currently supplied by the color operating circuit 506 are overwritten to the frame memory 511 at the address indicated by relevant FMAD (frame memory address data). Further, the Zs value currently supplied by the pixel expanding circuit 504 is overwritten in the Z-buffer memory 509 at the relevant address.

If the Zs value supplied by the color operating circuit is larger than the Zs value read from the Z-buffer memory 509 for the pixel, it is determined that the pixel having the color values currently supplied by the color operating circuit is located farther from the viewpoint than the pixel having the color values previously stored in the frame memory. Therefore, the color values currently supplied by the color operating circuit 506 are ignored. Further, the Zs value which is currently supplied by the pixel expanding circuit 504 is also ignored. Thus, the hidden-surface removal is performed.

Further, in accordance with a control signal supplied by the CRT controller 510, the memory control circuit 508 reads R, G, and B color values of a just preceding frame from the frame memory 511 and outputs them to the CRT controller 510. The CRT controller 510 sends them to a CRT via a D/A converter and an RGB encoder (not shown in the figure) in a form of a composite video signal.

Thus, in the fourth embodiment, during performance of texture mapping in use of the Z-buffer method, the texture data converter 502 determines the maximum one of transformed depth information Zs values of vertices of a currently processing polygon. The determined maximum values is used as a reference and thus transformed depth information Zs values of all the other vertices of the currently processing polygon are converted into values Zs' of the predetermined number of valid bits.

Then, the pixel expanding circuit 504 performs pixel expanding on the converted values Zs' and texture map data which has undergone the perspective transformation in use of the converted value Zs'. Then, the divider 533 divides the pixel-expansion performed texture map data MXs' and MYs' by the pixel-expansion performed, converted value Zs'.

In the fourth embodiment, the Zs' values are newly used, and DDA circuits for the Zs' values are additionally provided in the edge expanding circuit 503 and pixel expanding circuit 504. However, because the number of bits of Zs' value is small as described above, a number of bits in a DDA operation thereof is not large accordingly and therefore electrical circuit scales of the DDA circuits are not large. Further, the MXs' and MYs' of the predetermined number of valid bits less than that of the MXs and MYs are used. As a result, although the DDA circuits are used in the edge expanding circuit 503 and pixel expanding circuit 504 respectively, it is possible to prevent a total electrical circuit scale of the image processing system from being enlarged. Further, the Z-value converter 512 of the texture data converter 502 can be made of a simple circuit of shift register. It is possible to reduce the total electrical circuit scale of the image processing system as a number of bits of each of a multiplier (performing the calculation of the equations (14) and (15)) in the data converter 514 and the divider 533 in the pixel expanding circuit 504 can be reduced according to the bit-number reduction of the MXs' and MYs'.

With reference to FIG. 29, an image processing system in a fifth embodiment of the present invention will now be described.

FIG. 29 shows a block diagram of the pixel expanding circuit used in the fifth embodiment.

In the fifth embodiment, an arrangement of the pixel expanding circuit 504A is different from that of the fourth embodiment shown in FIG. 26. Specifically, instead of the divider 533 shown in FIG. 26, a reciprocal table 540 which is connected to a Zs' output terminal of the interpolating circuit 532 and a multiplier 541 which is connected to a MXs' output terminal and a MYs' output terminal of the interpolating circuit 532 are used as shown in FIG. 29.

The other part of the fifth embodiment is identical to that of the fourth embodiment, and therefore duplicated description will be omitted.

In the fifth embodiment, the calculation of the equations (16) and (17) is performed by the Zs' reciprocal table 540 and multiplier 541. Specifically, the reciprocal table 540 is a table including 1/Zs' values for Zs' values in a manner in which each Zs' value is lead to a respective 1/Zs' value. Thereby, when a Zs' value is input to the reciprocal table 540, a 1/Zs' value, that is, the reciprocal of the input Zs' value, can be obtained therefrom automatically. The multiplier 541 multiplies the thus obtained 1/Zs' by the MXs' and MYs', respectively. Thus, the calculation of the equations (16) and (17) is performed.

The other operation of the fifth embodiment is identical to that of the fourth embodiment, and therefore duplicated description will be omitted.

According to the fifth embodiment, in addition to the above-described advantages of the fourth embodiment, it is possible to reduce the total electrical circuit scale of the image processing system as a result of using the reciprocal table 540 and multiplier 541 instead of the divider 533.

Figure 31:
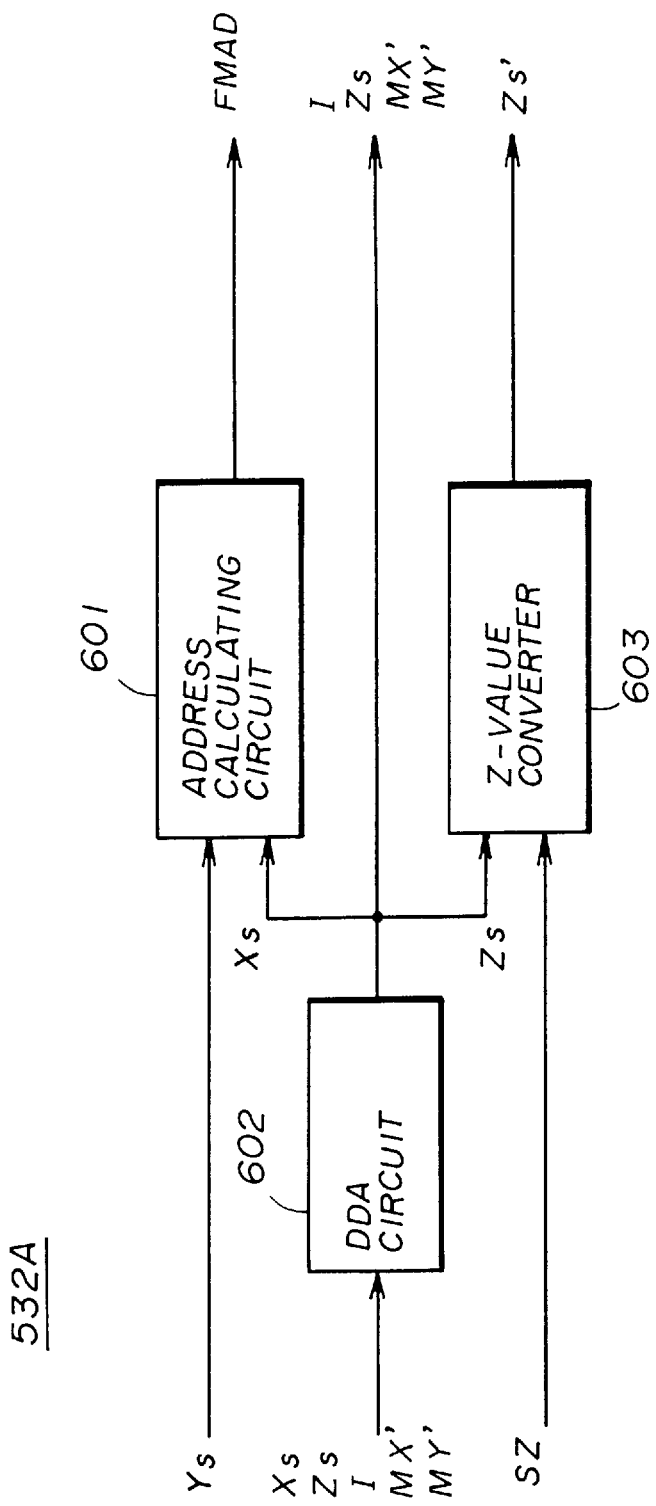
FIG. 31 shows a block diagram of an interpolating circuit in the sixth embodiment of the present invention.

With reference to FIGS. 30 and 31, an image processing system in a sixth embodiment of the present invention will now be described. The image processing system in the sixth embodiment may have an arrangement the same as that of the image processing system in the fourth embodiment described above. However, the texture data converter 502A has an arrangement shown in FIG. 30 instead of the texture data converter 502 shown in FIG. 23, and the pixel expanding circuit includes an interpolating circuit 532A, shown in FIG. 31, instead of the interpolating circuit 532 in the shown in FIG. 26. As mentioned above, the DDA circuits for the Zs' values are provided in the edge expanding circuit 503 and pixel expanding circuit 504 in the fourth embodiment. In contrast to this, in the sixth embodiment, such an extra DDA circuit for the Zs' value is provided neither in the edge expanding circuit and nor in the pixel expanding circuit.

In the sixth embodiment, data SZ is newly used. The data SZ is data indicating a bit-shift value used when producing the Zs' value from the Zs value for each polygon in a Z-value converter 512A shown in FIG. 30. The production of Zs' value is described above with reference to FIGS. 28A and 28B and bit shift operation is performed therein. The Z-value converter 512A is substantially the same as the Z-value converter 512 shown in FIG. 24. However, the Z-value converter 512A in the sixth embodiment outputs the bit-shift value data with regard to the bit shift operation. In FIG. 30, the other vertex data buffer 513 and data converter 514 may be the same as those in the fourth embodiment shown in FIG. 24. However, the data converter 514 does not output the Zs' value.

The data SZ output by the Z-value converter 512A is not undergo an DDA operation and is transferred to the pixel expanding circuit. In the pixel expanding circuit, the interpolating circuit 532A includes a Z-value converter 603 which is substantially the same as the Z-value converter 512A included in the texture data converter 502A shown in FIG. 30. The Z-value converter 603 uses the bit-shift value data SZ output by the Z-value converter 512A and the Zs value for each pixel output by a DDA circuit 602 shown in FIG. 31. Using the Zs value and the bit-shift value data, the Z-value converter 603 produces the same Zs' value as that produced by the Z-value converter 512A.

As described for the interpolating circuit 532 in the fourth embodiment with reference to FIG. 26, the interpolating circuit 532A in the pixel expanding circuit, using the DDA circuit 602, interpolates a straight line between each pair of points in parallel to scan lines SL shown in FIG. 27. Accordingly, image data for pixels present on the thus-interpolated straight line is obtained. In the interpolating operation, the Zs' values are not used, and Xs, Zs, I, MX' and MY' data is used as shown in FIG. 31. The interpolated Zs values are converted into the Zs' values through the Z-value converter 603. Accordingly, the DDA circuit 602 does not include a DDA circuit for the Zs' values.

An address calculating circuit 601 calculates the above-mentioned FMAD using the input Ys and Xs data.

In the sixth embodiment, extra units additionally provided for newly using the Zs' values are the Z-value converter 512A shown in FIG. 30, a transfer register provided in the edge expanding circuit for transferring the SZ data between the texture data converter and the pixel expanding circuit, and the Z-value converter 603 in the pixel expanding circuit.

The present invention is not limited to the above-described embodiments, and variations and modifications may be made without departing from the scope of the present invention.

What is claimed is:

1. A three-dimensional image processing method comprising the steps of:
   a) performing perspective transformation on X, Y, Z coordinate data Xe, Ye and Ze in a view volume in a viewpoint coordinate system so as to obtain X, Y, Z coordinate data Xs, Ys and Zs in a screen coordinate system,
   said view volume being defined by a front clipping plane and a rear clipping plane, a manner in which the Zs values are calculated changing depending on a distance between said front clipping plane and said rear clipping plane and in which:

$$Zs=1-CZF/Ze,$$

when a difference between a Z value CZF at said front clipping plane and a Z value CZB at said rear clipping plane is substantially large; and
   b) performing a hidden-surface removal operation using a Z-buffer method in accordance with said Zs coordinate data.

2. A three-dimensional image processing method comprising the steps of:
   a) performing perspective transformation on X, Y, Z coordinate data Xe, Ye and Ze in a view volume in a viewpoint coordinate system so as to obtain X, Y, Z coordinate data Xs, Ys and Zs in a screen coordinate system, a manner in which the Zs values are calculated changing depending on a distance between a front clipping plane and a rear clipping plane and in which:

$$Zs=CZF/Ze,$$

in one of a first case and a second case, said first case being a case wherein a difference between a Z value CZF at said front clipping plane and a Z value CZB at said rear clipping plane is substantially large, said view volume being defined by both of said front clipping plane and said rear clipping plane, and said second case being a case where said view volume is defined only by said front clipping plane; and
   b) performing a hidden-surface removal operation using a Z-buffer method in accordance with said Zs coordinate data.

3. A three-dimensional image processing method comprising the steps of:
   a) performing perspective transformation on X, Y, Z coordinate data Xe, Ye and Ze in a view volume in a viewpoint coordinate system so as to obtain X, Y, Z coordinate data Xs, Ys and Zs in a screen coordinate system, a manner in which the Zs values are calculated changing depending on a distance between a front clipping plane and a rear clipping plane and in which:

$$Zs=1/Ze$$

and data bits of said Zs coordinate data are shifted depending on a Z value CZF, in one of a first case and a second case, said first case being a case where a difference between said Z value CZF at said front clipping plane and a Z value CZB at said rear clipping plane is substantially large, said view volume being defined by both of said front clipping plane and said rear clipping plane, and said second case being a case where said view volume is defined only by said front clipping plane; and
   b) performing a hidden-surface removal operation using a Z-buffer method in accordance with said Zs coordinate data.

4. The method according to claim 3, wherein the data bit sifting in said step a) is performed by one of a barrel shifter and a multiplexer.

5. A three-dimensional image processing system comprising:
   means for performing perspective transformation on X, Y, Z coordinate data Xe, Ye and Ze in a view volume in a viewpoint coordinate system so as to obtain X, Y, Z coordinate data Xs, Ys and Zs in a screen coordinate system,
   said view volume being defined by a front clipping plane and a rear clipping plane, a manner in which the Zs values are calculated changing depending on a distance between said front clipping plane and said rear clipping plane and in which:

$$Zs=1-CZF/Ze,$$

when a difference between a Z value CZF at said front clipping plane and a Z value CZB at said rear clipping plane is substantially large; and
   means for performing a hidden-surface removal operation using a Z-buffer method in accordance with said Zs coordinate data.

6. A three dimensional image processing system comprising:
   means for performing perspective transformation on X, Y, Z coordinate data Xe, Ye and Ze in a view volume in a viewpoint coordinate system so as to obtain X, Y, Z coordinate data Xs, Ys and Zs in a screen coordinate system, a manner in which the Zs values are calculated changing depending on a distance between a front clipping plane and a rear clipping plane and in which:

$$Zs=CZF/Ze,$$

in one of a first case and a second case, said first case being a case where a difference between a Z value CZF at said front clipping plane and a Z value CZB at said rear clipping plane is substantially large, said view volume being defined by both said front clipping plane and said rear clipping plane, and said second case being a case where said view volume is defined only by said front clipping plane; and
   means for performing a hidden-surface removal operation using a Z-buffer method in accordance with said Zs coordinate data.

7. A three-dimensional image processing system comprising:
   means for performing perspective transformation on X, Y, Z coordinate data Xe, Ye and Ze in a view volume in a viewpoint coordinate system so as to obtain X, Y, Z coordinate data Xs, Ys and Zs in a screen coordinate system, a manner in which the Zs values are calculated changing depending on a distance between a front clipping plane and a rear clipping plane and in which:

$$Zs=1/Ze,$$

and data bits of said Zs coordinate data are shifted depending on a Z value CZF, in one of a first case and a second case, said first case being a case where a difference between said Z value CZF at said front clipping plane and a Z value CZB at said rear clipping plane is substantially large, said view volume being defined by both said front clipping plane and said rear clipping plane, and said second base being a case where said view volume is defined only by said front clipping plane; and means for performing a hidden-surface removal operation using a Z-buffer method in accordance with said Zs coordinate data.

8. The system according to claim 5, further comprising:

means for interpolating left edges and right edges of image data between vertices of a polygon of image data;

means for interpolating pixels of image data between said left edges and said right edges;

said image data comprising Zs data and X, Y coordinate data of a texture map; and means for reading texture data from a texture mapping memory in accordance with said X, Y coordinate data of said texture map of said image data obtained from said means for interpolating pixels of image data.

9. The system according to claim 6, further comprising:

means for interpolating left edges and right edges of image data between vertices of a polygon of image data;

means for interpolating pixels of image data between said left edges and said right edges;

said image data comprising Zs data and X, Y coordinate data of a texture map; and means for reading texture data from a texture mapping memory in accordance with said X, Y coordinate data of said texture map of said image data obtained from said means for interpolating pixels of image data.

10. The system according to claim 7, further comprising:

means for interpolating left edges and right edges of image data between vertices of a polygon of image data;

means for interpolating pixels of image data between said left edges and said right edges;

said image data comprising Zs data and X, Y coordinate data of a texture map; and means for reading texture data from a texture mapping memory in accordance with said X, Y coordinate data of said texture map of said image data obtained from said means for interpolating pixels of image data.

11. The system according to claim 8, further comprising register file means for temporarily storing a plurality of polygons of image data at the same time, said plurality of polygons of image data being transferred from said means for performing perspective transformation.

12. The system according to claim 9, further comprising register file means for temporarily storing a plurality of polygons of image data at the same time, said plurality of polygons of image data being transferred from said means for performing perspective transformation.

13. The system according to claim 10, further comprising register file means for temporarily storing a plurality of polygons of image data at the same time, said plurality of polygons of image data being transferred from said means for performing perspective transformation.

14. The system according to claim 8, further comprising means for multiplying said X, Y coordinate data of said texture map and said Zs coordinate data together for obtaining multiplied coordinate data of said texture map;

and wherein: said means for interpolating left edges and right edges interpolates image data between vertices of said polygon of image data including said multiplied coordinate data of said texture map; and said means for interpolating pixels interpolates image data between said left edges and said right edges of image data;

and said system further comprises means for dividing X, Y coordinate data of said texture map included in said pixels of image data by said Zs coordinate data included in said pixels of image data to obtain divided coordinate data of said texture map;

and wherein said means for reading texture data reads said texture data from said texture mapping memory in accordance with said divided coordinate data of said texture map.

15. The system according to claim 9, further comprising means for multiplying said X, Y coordinate data of said texture map and said Zs coordinate data together for obtaining multiplied coordinate data of said texture map;

and wherein: said means for interpolating left edges and right edges interpolates image data between vertices of said polygon of image data including said multiplied coordinate data of said texture map; and said means for interpolating pixels interpolates image data between said left edges and said right edges of image data;

and said system further comprises means for dividing X, Y coordinate data of said texture map included in said pixels of image data by said Zs coordinate data included in said pixels of image data to obtain divided coordinate data of said texture map;

and wherein said means for reading texture data reads said texture data from said texture mapping memory in accordance with said divided coordinate data of said texture map.

16. The system according to claim 10, further comprising means for multiplying said X, Y coordinate data of said texture map and said Zs coordinate data together and thus producing multiplied coordinate data of said texture map;

and wherein: said means for interpolating left edges and right edges interpolates image data between vertices of said polygon of image data including said multiplied coordinate data of said texture map; and said means for interpolating pixels interpolates image data between said left edges and said right edges of image data;

and said system further comprises means for dividing X, Y coordinate data of said texture map included in said pixels of image data by said Zs coordinate data included in said pixels of image data to obtain divided coordinate data of said texture map;

and wherein said means for reading texture data reads said texture data from said texture mapping memory in accordance with said divided coordinate data of said texture map.

17. The system according to claim 8, wherein said image data includes luminance data I;

and said system further comprising means for multiplying said data I and said Zs coordinate data together to produce multiplied luminance data;

and wherein: said means for interpolating left edges and right edges interpolates image data between vertices of said polygon of image data including said multiplied luminance data; and said means for interpolating pixels interpolates image data between said left edges and said right edges of image data;

and said system further comprising means for dividing luminance data included in said pixels of image data by said Zs coordinate data included in said pixels of image data to produce divided luminance data; and and wherein said means for reading texture data reads texture data from said texture mapping memory in accordance with X, Y coordinate data of said texture map included in said pixels of image data; and said system further comprising means for calculating colors of texture using said texture data and said divided luminance data.

18. The system according to claim 9, wherein said image data includes luminance data I;

and said system further comprising means for multiplying said data I and said Zs coordinate data together to produce multiplied luminance data;

and wherein: said means for interpolating left edges and right edges interpolates image data between vertices of said polygon of image data including said multiplied luminance data; and said means for interpolating pixels interpolates image data between said left edges and said right edges of image data;

and said system further comprising means for dividing luminance data included in said pixels of image data by said Zs coordinate data included in said pixels of image data to produce divided luminance data; and and wherein said means for reading texture data reads texture data from said texture mapping memory in accordance with X, Y coordinate data of said texture map included in said pixels of image data; and said system further comprising means for calculating colors of texture using said texture data and said divided luminance data.

19. The system according to claim 10, wherein said image data includes luminance data I;

and said system further comprising means for multiplying said data I and said Zs coordinate data together to produce multiplied luminance data;

and wherein: said means for interpolating left edges and right edges interpolates image data between vertices of said polygon of image data including said multiplied luminance data; and said means for interpolating pixels interpolates image data between said left edges and said right edges of image data;

and said system further comprising means for dividing luminance data included in said pixels of image data by said Zs coordinate data included in said pixels of image data to produce divided luminance data; and and wherein said means for reading texture data reads texture data from said texture mapping memory in accordance with X, Y coordinate data of said texture map included in said pixels of image data; and said system further comprising means for calculating colors of texture using said texture data and said divided luminance data.

20. The system according to claim 8, further comprising a transparent mapping memory for storing a flag which indicates if each said pixel is a transparent pixel.

21. The system according to claim 9, further comprising a transparent mapping memory for storing a flag which indicates if each said pixel is a transparent pixel.

22. The system according to claim 10, further comprising a transparent mapping memory for storing a flag which indicates if each of said pixels is a transparent pixel.

* * * * *